United States Patent
Kojima et al.

(10) Patent No.: US 10,151,991 B2
(45) Date of Patent: Dec. 11, 2018

(54) TONER, TONER STORED UNIT, AND IMAGE FORMING APPARATUS

(71) Applicants: Satoshi Kojima, Shizuoka (JP); Yoshihiro Moriya, Shizuoka (JP); Masahiko Ishikawa, Shizuoka (JP); Satoshi Takahashi, Kanagawa (JP); Tatsuru Moritani, Shizuoka (JP); Tatsuki Yamaguchi, Shizuoka (JP)

(72) Inventors: Satoshi Kojima, Shizuoka (JP); Yoshihiro Moriya, Shizuoka (JP); Masahiko Ishikawa, Shizuoka (JP); Satoshi Takahashi, Kanagawa (JP); Tatsuru Moritani, Shizuoka (JP); Tatsuki Yamaguchi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/675,945

(22) Filed: Aug. 14, 2017

(65) Prior Publication Data
US 2017/0343912 A1    Nov. 30, 2017

Related U.S. Application Data

(63) Continuation of application No. PCT/JP2016/053428, filed on Feb. 4, 2016.

(30) Foreign Application Priority Data

| Feb. 17, 2015 | (JP) | 2015-028949 |
| Feb. 18, 2015 | (JP) | 2015-029791 |
| Oct. 14, 2015 | (JP) | 2015-202696 |

(51) Int. Cl.
*G03G 9/087* (2006.01)
*G03G 9/08* (2006.01)
*G03G 9/09* (2006.01)

(52) U.S. Cl.
CPC .......... *G03G 9/08795* (2013.01); *G03G 9/08* (2013.01); *G03G 9/0804* (2013.01);
(Continued)

(58) Field of Classification Search
CPC combination set(s) only.
See application file for complete search history.

(56) References Cited

U.S. PATENT DOCUMENTS

| 5,733,701 A | 3/1998 | Anno et al. |
| 5,932,386 A | 8/1999 | Anno et al. |

(Continued)

FOREIGN PATENT DOCUMENTS

| JP | 05-341577 | 12/1993 |
| JP | 07-084401 | 3/1995 |

(Continued)

OTHER PUBLICATIONS

International Search Report dated May 10, 2016 for counterpart International Patent Application No. PCT/JP2016/053428 filed Feb. 4, 2016 ( with English translation).

(Continued)

*Primary Examiner* — Peter L Vajda
(74) *Attorney, Agent, or Firm* — Oblon, McClelland, Maier & Neustadt, L.L.P.

(57) ABSTRACT

Provided is a toner including at least: a binder resin; and a release agent, wherein in a transmission electron microscopic (TEM) image of a torn cross-section of the toner, the release agent has an acicular or filiform shape and an average aspect ratio of 31 or greater, and wherein a displacement amount of the toner when 250 micronewtons is applied to the toner in a microcompression test is 700 nm or less.

7 Claims, 5 Drawing Sheets

(52) U.S. Cl.
CPC ......... *G03G 9/0821* (2013.01); *G03G 9/0825* (2013.01); *G03G 9/08797* (2013.01); *G03G 9/0926* (2013.01); G03G 9/08711 (2013.01); G03G 9/08755 (2013.01); G03G 9/08782 (2013.01); G03G 9/08786 (2013.01)

(56) References Cited

U.S. PATENT DOCUMENTS

| | | |
|---|---|---|
| 9,141,013 B2 | 9/2015 | Moriya et al. |
| 2005/0130053 A1* | 6/2005 | Ishiyama ............ G03G 9/0821 430/108.8 |
| 2007/0218383 A1 | 9/2007 | Seshita et al. |
| 2008/0070144 A1 | 3/2008 | Nagatomo et al. |
| 2008/0226998 A1 | 9/2008 | Ishii et al. |
| 2008/0227002 A1 | 9/2008 | Moriya et al. |
| 2009/0003885 A1 | 1/2009 | Sabu et al. |
| 2009/0142094 A1 | 6/2009 | Sawada et al. |
| 2010/0119255 A1 | 5/2010 | Seshita et al. |
| 2011/0065036 A1 | 3/2011 | Inoue et al. |
| 2011/0124838 A1 | 5/2011 | Kotsugai et al. |
| 2011/0281213 A1 | 11/2011 | Sakashita et al. |
| 2012/0264049 A1 | 10/2012 | Masuda et al. |
| 2012/0270147 A1 | 10/2012 | Katoh et al. |
| 2012/0295188 A1 | 11/2012 | Nakajima et al. |
| 2013/0045442 A1 | 2/2013 | Moriya et al. |
| 2013/0065172 A1 | 3/2013 | Moriya et al. |
| 2013/0149642 A1 | 6/2013 | Sabu et al. |
| 2013/0157193 A1 | 6/2013 | Moritani et al. |
| 2013/0171550 A1 | 7/2013 | Amemori et al. |
| 2013/0202996 A1 | 8/2013 | Yamauchi et al. |
| 2013/0243488 A1 | 9/2013 | Kojima et al. |
| 2013/0244155 A1 | 9/2013 | Satoh et al. |
| 2013/0244156 A1 | 9/2013 | Kojima et al. |
| 2013/0244167 A1 | 9/2013 | Yamashita et al. |
| 2013/0244168 A1 | 9/2013 | Yamashita et al. |
| 2013/0273188 A1 | 10/2013 | Takahashi et al. |
| 2014/0038100 A1 | 2/2014 | Katoh et al. |
| 2014/0072349 A1 | 3/2014 | Sakashita et al. |
| 2014/0140731 A1 | 5/2014 | Hozumi et al. |
| 2014/0141110 A1 | 5/2014 | Katoh et al. |
| 2014/0220485 A1 | 8/2014 | Kojima et al. |
| 2014/0234767 A1 | 8/2014 | Awamura et al. |
| 2014/0242514 A1 | 8/2014 | Inoue et al. |
| 2014/0272695 A1 | 9/2014 | Moritani et al. |
| 2015/0104739 A1 | 4/2015 | Nagatomo et al. |
| 2015/0108671 A1 | 4/2015 | Norikane et al. |
| 2015/0234303 A1 | 8/2015 | Moriya et al. |
| 2015/0241804 A1 | 8/2015 | Takahashi et al. |
| 2015/0253686 A1 | 9/2015 | Miyakoshi et al. |
| 2015/0261111 A1 | 9/2015 | Inoue et al. |
| 2015/0362852 A1 | 12/2015 | Moriya et al. |

FOREIGN PATENT DOCUMENTS

| | | |
|---|---|---|
| JP | 09-134027 | 5/1997 |
| JP | 2008-107678 | 5/2008 |
| JP | 2009-134061 | 6/2009 |
| JP | 2009-294492 | 12/2009 |
| JP | 2010-091775 | 4/2010 |
| JP | 2011-194675 | 10/2011 |
| JP | 2012-185219 | 9/2012 |
| JP | 2014-149509 | 8/2014 |
| JP | 2015-172721 | 10/2015 |
| WO | WO2015/029843 A1 | 3/2015 |

OTHER PUBLICATIONS

Written Opinion dated May 10, 2016 for counterpart International Patent Application No. PCT/JP2016/053428 filed Feb. 4, 2016.

* cited by examiner

TONER, TONER STORED UNIT, AND IMAGE FORMING APPARATUS

CROSS-REFERENCE TO RELATED APPLICATIONS

The present application is a continuation application of International Application No. PCT/JP2016/053428, filed Feb. 4, 2016, which claims priority to Japanese Patent Application No. 2015-028949, filed Feb. 17, 2015, Japanese Patent Application No. 2015-029791, filed Feb. 18, 2015, and Japanese Patent Application No. 2015-202696, filed Oct. 14, 2015. The contents of these applications are incorporated herein by reference in their entirety.

BACKGROUND OF THE INVENTION

Field of the Invention

The present invention relates to a toner used in, for example, electrophotography, electrostatic recording, and electrostatic printing, a toner stored unit containing the toner, and an image forming apparatus.

Description of the Related Art

Toners used in, for example, electrophotography, electrostatic recording, and electrostatic printing are once attached on image bears such as electrostatic latent image bearers on which electrostatic charge images are formed in the developing step, transferred onto transfer media such as transfer sheets from the electrostatic latent image bearers in the transfer step, and fixed on the sheet surfaces in the fixing step. As the fixing methods, fixing methods by contact-heating/melting with, for example, a heated roll or belt are thermally efficient and commonly employed.

However, the contact-heating fixing methods have a problem that offset is likely to occur to make melted toners adhere to the heat roll or belt.

In order to prevent the offset, there have been proposed some methods of adding release agents such as waxes in the toners. One of the proposals is a toner that contains a wax having a specific endothermic peak in a measurement using differential scanning calorimetry (DSC) (see, e.g., Japanese Unexamined Patent Application Publication No. 07-84401). Another example proposed is the use of, for example, a candelilla wax, a higher fatty acid-based wax, a higher alcohol-based wax, a plant-based natural wax (a carnauba wax or a rice wax), and a montan-based ester wax as the release agents (see, e.g., Japanese Unexamined Patent Application Publication No. 05-341577).

These release agents quickly melt and get exposed to the surfaces of the toner particles when the toners pass under a heated roll or belt member in the contact-heating fixing methods, to suppress the melted toners from adhering to the fixing member. The release agents are influential not only to the offset property at a low fixing temperature side (cold offset) but also to the offset property at a high fixing temperature side (hot offset).

Meanwhile, positioning of a release agent near the surface of a toner, taken as a measure for promoting exposure of the release agent from the toner, does suppress the offset, but makes adherence of melts due to the release agent likely to occur along with stirring in, for example, a developing device, to make the toner adhere in a crushed state to the carrier or a photoconductor, to reduce the charge capacity of the toner. That is, there is a need that the release agent be present in a state of being protected inside the toner during stirring and storage, and be exposed to the surface effectively in a short time during which the toner passes under a fixing member during fixing and express releasability from the fixing member.

To this issue, many studies that prescribe the dispersed particle diameters of waxes as the release agents have been reported (see, e.g., Japanese Unexamined Patent Application Publication No. 2009-134061 and Japanese Patent No. 5146665). By prescribing the dispersed particle diameters, these studies are effective in preventing the offset while maintaining toner granularity. However, it typically cannot be helped but the waxes become smaller than the toner particle diameters in order to be introduced into the toners in a state that the waxes are dispersed, and it is extremely difficult to keep such small waxes near the surfaces without being exposed. Furthermore, how the waxes are present near the surfaces is also influential to environmental stability of chargeability. For example, when a lot of waxes are exposed, chargeability becomes insufficient under high-temperature, high-humidity conditions, to make white voids and toner scattering likely to occur.

Moreover, in order to impart offset resistance to the toners, it is more effective to position the release agents in the toners as relatively large blocks than to locally position the release agents as small domains. However, increase of the adding amounts more than needed in order to make the domains larger leads to decrease of the overall strength of the toners, to make the toners likely to be crushed, leading to degradation of chargeability and background smear.

For example, Japanese Patent No. 5146665 reports that a toner in which the aspect ratio and size of the release agent are prescribed can improve low-temperature fixability, background smear, and chargeability. However, the method of Japanese Patent No. 5146665 is still insufficient for improving particle strength and obtaining a greater durability while maintaining a good offset resistance and a good toner chargeability. Particularly, when a toner containing a release agent is used in non-magnetic one-component development and passes under a blade configured to regulate the thickness of the toner layer, the toner is crushed and adhere under an excessive load applied at the blade portion, to significantly degrade the image qualities. Therefore, the toner needs to have a durability equal to or greater than needed in two-component development.

There has also been reported a proposal that has satisfied hot offset resistance and long-term high-quality stability with a toner in which a binder resin and a release agent are phase-separated (see, e.g., Japanese Unexamined Patent Application Publication No. 2012-185219). However, this proposal also has a risk that increase in the interface between the release agent and the binder resin due to the phase separation reduces particle hardness to cause, for example, crushing of the particles in, for example, the developing step, leading to carrier contamination or charge level degradation.

That is, the existing techniques are insufficient for satisfying offset resistance effectively with a small adding amount of a release agent, and achieving a certain particle hardness and temporal image quality stability, and need further improvements.

SUMMARY OF THE INVENTION

According to one aspect of the present invention, a toner contains at least a binder resin and a release agent. In a transmission electron microscopic (TEM) image of a torn cross-section of the toner, the release agent has an acicular or filiform shape and an average aspect ratio of 31 or greater. The displacement amount of the toner when 250 micronewtons is applied to the toner in a microcompression test is 700 nm or less.

DESCRIPTION OF THE EMBODIMENTS

Figure 1:
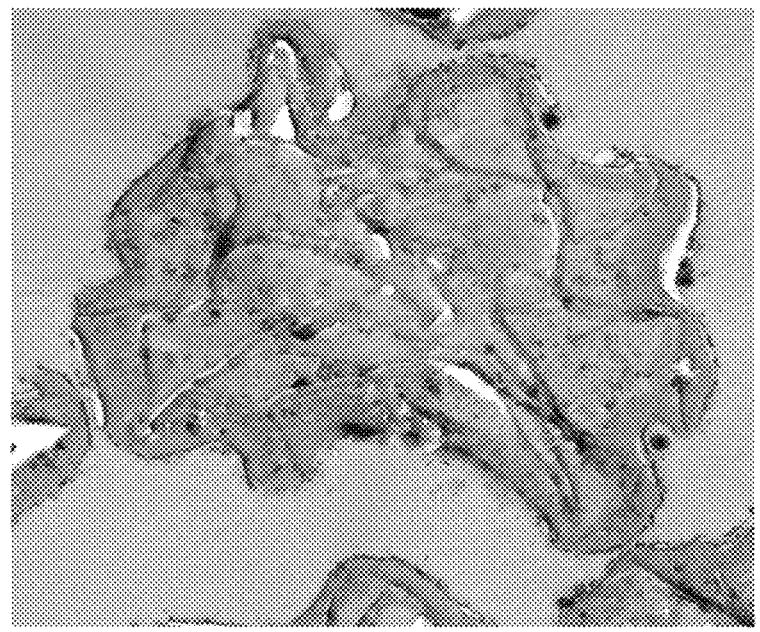
FIG. 1 is a diagram illustrating a TEM image of a cross-section of a toner of the present invention.

The present invention has an object to provide a toner in which a release agent is positioned in a state of realizing effective exuding during fixing, that has a predetermined particle hardness, that is excellent in offset resistance, charging stability, stress resistance, and background smear, and that can provide highly accurate, high-quality images for a long term.

The present invention can solve the various problems in the related art, achieve the object described above, and provide a toner in which a release agent is positioned in a state of realizing effective exuding during fixing, that has a predetermined particle hardness, that is excellent in offset resistance, charging stability, stress resistance, and background smear, and that can provide highly accurate, high-quality images for a long term.
(Toner)

A toner of the present invention contains at least a binder resin and a release agent, and further contains other components such as a colorant, a pigment dispersant, and a charge controlling agent as needed. The toner may further contain a fluidity improver and a cleanability improver as needed.

The present inventors have found that a toner having the properties described below is effective for solving the problems described above.

A toner in which a release agent having an acicular or filiform shape is dispersed finely and uniformly and encapsulated in a state of having a high aspect ratio enables the release agent to be effectively exuded from inside the toner during fixing, leading to an excellent offset resistance. The toner that gives a predetermined value or less as a displacement amount in a microcompression test has an excellent charging stability and an excellent stress resistance. The toner of the present invention has a sharp particle size distribution and an excellent image quality.

As described above, when the release agent is positioned inside the toner in a state that a binder resin and the release agent are phase-separated, particularly in a state that the release agent has an acicular or filiform shape, an excellent low-temperature fixability is expressed, but tearing is likely to occur at the interface between the binder resin and the release agent, to make the toner likely to be crushed under a stress in the developing step. However, in the present invention, the toner gives a predetermined value or less as a displacement amount upon a predetermined pressure load. In other words, the toner has a predetermined high hardness. Therefore, the toner can express stress resistance and a high charging stability.
<Properties of Toner>

The toner of the present invention is a toner containing at least a binder resin and a release agent. The release agent is observed as an acicular or filiform shape in a transmission electron microscopic (TEM) image of a torn cross-section of the toner. The average aspect ratio of the release agent calculated from that shape is 31 or greater.
<<TEM Observation>>

The sample for TEM observation is prepared as follows, for example.

First, the toner is embedded in an epoxy resin and then sliced with an ultramicrotome (ultrasonic), to produce a thin leaf formed of the toner. Next, with a transmission electron microscope, torn cross-sections of the toner are observed with the magnification of the microscope adjusted to enlarge the field of view of the microscope until it becomes possible to measure the aspect ratio of the release agent from the torn cross-sections. Arbitrary 50 torn cross-sections of the toner are extracted as measurement samples. After extraction, image files of these samples are analyzed with image analyzing software IMAGEJ in the manner described below, to obtain the aspect ratio of the release agent.

The aspect ratio of the release agent is calculated as a ratio obtained by dividing the longer diameter Ll of the release agent by the shorter diameter Ls of the release agent.

In the present invention, from one torn cross-section of the toner, Ll and Ls of the release agent that is observed to have the maximum longer diameter in the torn cross-section are obtained, to calculate the aspect ratio. The same operation is performed for each torn cross-section of the toner, to average the aspect ratios obtained from the 50 torn cross-sections of the toner, to obtain the average aspect ratio.

FIG. 1 illustrates a torn cross-section of the toner containing an acicular or filiform release agent. Staining with ruthenium/osmium is performed to adjust the contrast and emphasize the release agent in the toner, in order to determine the release agent having the maximum longer diameter. A maximum release agent length (hereinafter may also be referred to as "Lmax") of this release agent is obtained. Lmax is obtained by performing plotting in a manner to pass the center of the release agent image with IMAGEJ multi-point selection, to obtain the total of the distances between the plotted points as the length of the release agent.

The method for measuring the maximum length Lmax of the release agent in the toner of the present invention will be described with reference to FIG. 2A.

Figure 2A:
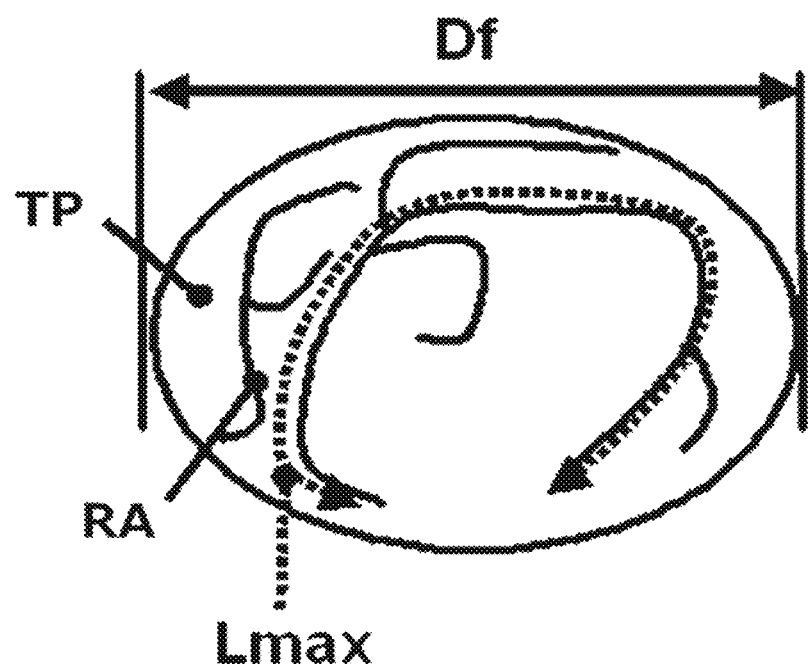
FIG. 2A is a diagram illustrating a method for measuring a maximum ferre diameter Df of a toner of the present invention and a maximum length Lmax of a release agent.

In FIG. 2A, TP denotes a toner particle, RA denotes the release agent, Lmax denotes the maximum release agent length, and Df denotes a maximum ferre diameter.

The maximum length Lmax of the release agent in the toner particle refers to the length (longer diameter) of the release agent plotted as the longest curve among the release agent present in the toner particle, when the curve is plotted between the farthest vertices of the release agent as the ends and in a manner to pass the center of the release agent image. The method for obtaining the length (longer diameter) is as described above.

Figure 2B:
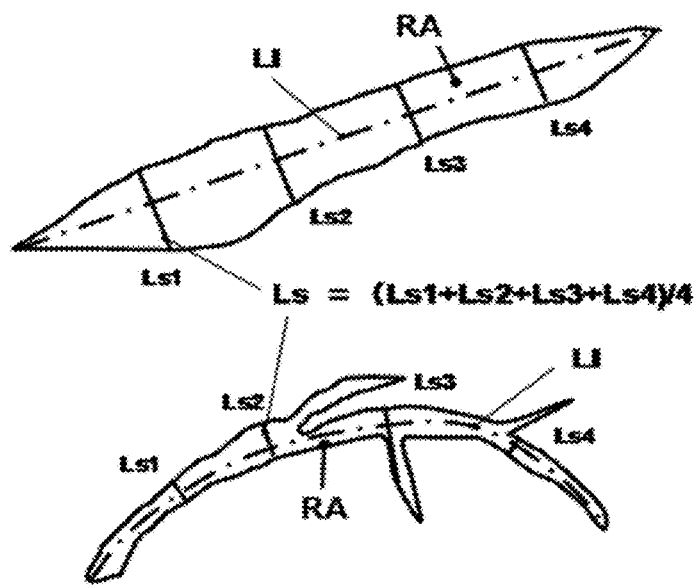
FIG. 2B is a diagram illustrating a method for measuring an aspect ratio of a release agent in a toner of the present invention.

FIG. 2B illustrates a method for measuring the aspect ratio of the release agent in the toner of the present invention.

In FIG. 2B, RA denotes the release agent, Ll denotes the longer diameter of the release agent, and Ls denotes the shorter diameter of the release agent.

For the aspect ratio of the present invention, the longer diameter Ll is defined as the maximum longer diameter of the release agent having the maximum longer diameter among the release agent observed in the TEM image, and the shorter diameter Ls is defined as the average of the lengths (Ls1 through Ls4) of that release agent when orthogonal lines are drawn to the points that divide the longer diameter into 5 equal parts. The aspect ratio can be obtained by dividing the longer diameter Ll of the release agent by the shorter diameter Ls of the release agent.

When the release agent and release agent that are observed in a torn cross-section overlap each other, the overlapped state is calculated as one release agent domain. Further, when Ls1 through Ls4 extend on branched portions of the release agent, the average is calculated using values that do not include those portions.

The average aspect ratio of the release agent in the present invention needs to be 31 or greater. When the average aspect ratio is less than 31, it becomes easier for the release agent to be exposed to the surface, to make toner chargeability degradation due to bleeding and background smear likely to occur and toner particle strength degradation more likely to occur.

The average aspect ratio is preferably in a range of from 50 through 1,000, more preferably in a range of from 100 through 900, and yet more preferably in a range of from 200 through 900.

The maximum release agent length Lmax in the toner particle is preferably greater than or equal to 0.5 times, and more preferably greater than or equal to 1.1 times but less than 1.6 times as large as a maximum ferre diameter Df of the toner particle containing the release agent.

As illustrated in FIG. 2A, the maximum ferre diameter Df refers to the distance between 2 parallel lines when the 2 parallel lines are farthest from each other when drawn as tangents on any both ends of the circumference of the torn cross-section of the toner in the TEM image.

When Lmax is greater than or equal to 0.5 times as large as Df, it becomes easier for a release agent locally present inside the toner to have both ends near the surface of the toner. This makes the offset property better without disturbing exuding during fixing. Furthermore, the release agent is positioned thoroughly inside the toner in a network state. This improves stiffness and suppresses crushing.

<<Measurement of Displacement Amount in Microcompression Test>>

The toner of the present invention gives a displacement amount of 700 nm or less and more preferably 500 nm or less when 250 micronewtons is applied to the toner in a microcompression test. When the displacement amount is greater than 700 nm, the toner is excessively soft and likely to deform under a stress in the developing process. Further, when the displacement amount is large, the toner may have been crushed during the measurement without being able to endure the load of 250 micronewtons. In this case, it is assumed that the toner will not be able to endure a developing stress, crush in the developing device, and have chargeability degradation due to, for example, carrier contamination.

The method for the microcompression test will be described below.

The particle hardness (displacement amount) of the toner is measured with an ultramicroindentation hardness tester such as a nano indenter (ENT-2100) available from Elionix Inc.

A load is applied to the toner particles at the maximum load of 250 micronewtons, to indent a Berkovich indenter having a conical shape with an intercristal angle of 115 degrees into the toner particles. The displacement amount of the Berkovich indenter until the load applied to the toner particles changes from 0 micronewtons to 250 micronewtons is measured as the measurement of the displacement amount at the maximum load of 250 micronewtons.

<<Differential Scanning Calorimetry (DSC) Measurement of Release Agent Content (% by Mass)>>

In the present invention, the content of the release agent in the toner expressed as a mass equivalent of an endothermic amount of the release agent obtained by a differential scanning calorimetry (DSC) method is preferably from 1% by mass through 10% by mass of the toner.

The method for measuring the content ratio of the release agent is as follows.

The total amount of the release agent in the toner particles is obtained by a differential scanning calorimetry (DSC) method. A sample of the toner and a pure sample of the release agent alone are individually measured with a measuring instrument described below under conditions described below. The content of the release agent in the toner is obtained from the ratio between the endothermic amounts of the release agent obtained from both.

Measuring instrument: DSC instrument (DSC 60; available from Shimadzu Corporation)

Amount of sample: about 5 mg

Temperature rise: 10 degrees C./min

Range of measurement: from room temperature through 150 degrees C.

Measuring environment: in a nitrogen gas atmosphere

The total amount of the release agent is calculated according to formula 2 below.

Total amount (% by mass) of release agent=(endothermic amount (J/g) of release agent in toner sample)×100)/(endothermic amount (J/g) of pure release agent)   Formula 2)

According to this measuring method, the total amount of the release agent in the toner particles can be measured even when the blended amount of the release agent is not fully contained in the toner due to spillage of the release agent during the toner production process.

The content of the release agent in the toner obtained by the DSC method is preferably from 1% by mass through 10% by mass of the toner containing the release agent. When the total amount of the release agent is 1% by mass or greater, the release agent can be contained in the toner particles without being too scarce. This provides a sufficient releasability during fixing without degradation of the offset resistance. It is preferable that the total amount of the release agent be 10% by mass or less, because filming resistance will not be degraded and glossiness of a color image after fixed will not be lost.

<Metal Salt of Aromatic Carboxylic Acid>

The toner of the present invention preferably contains a metal compound of an aromatic carboxylic acid. Examples of the metal compound of the aromatic carboxylic acid include metal salts of salicylic acid, metal complexes of salicylic acid, metal salts of alkylsalicylic acid, metal complexes of alkylsalicylic acid, metal salts of dialkylsalicylic acid, metal complexes of dialkylsalicylic acid, and metal salts and metal complexes of dibenzoic acid.

Examples of the metal include $Zn^{2+}$, $Al^{3+}$, $Cr^{3+}$, $Fe^{3+}$, and $Zr^{4+}$. A metal compound of an aromatic carboxylic acid in a state with a high metal valence is preferable for improving the particle hardness.

<<Metal Salt of Salicylic Acid and Metal Salt of Salicylic Acid Derivative>>

The metal compound of the aromatic carboxylic acid is more preferably a metal salt of salicylic acid or a salicylic acid derivative. Examples of the metal include $Zn^{2+}$, $Al^{3+}$, $Cr^{3+}$, $Fe^{3+}$, and $Zr^{4+}$. A metal salt of salicylic acid or a salicylic acid derivative in a state with a high metal valence is preferable for improving the particle hardness.

It is preferable to select the salicylic acid or the salicylic acid derivative from general formula (1) below, general formula (2) below, and general formula (3) below.

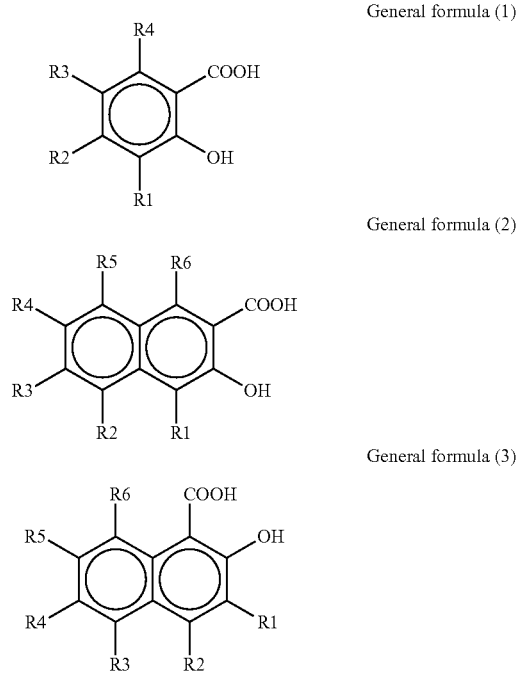

General formula (1)

General formula (2)

General formula (3)

[In general formula (1), general formula (2), and general formula 3), R1 through R6 represent the same group or different groups, and represent a hydrogen atom, an alkyl group containing from 1 through 12 carbon atoms, an alkenyl group containing from 2 through 12 carbon atoms, —OH, —NH$_2$, —NH(CH$_3$), —N(CH$_3$)$_2$, —OCH$_3$, —O(C$_2$H$_5$), —COOH, or —CONH$_2$.]

For example, a metal salt of salicylic acid or a salicylic acid derivative can be synthesized by dissolving salicylic acid or a salicylic acid derivative in a sodium hydroxide aqueous solution, dropping an aqueous solution in which a divalent or higher metal atom is dissolved into the sodium hydroxide aqueous solution, stirring the aqueous solution under heating, adjusting pH of the aqueous solution, cooling the aqueous solution to room temperature, filtrating the aqueous solution, and washing the resultant with water.

A metal salt of salicylic acid or a salicylic acid derivative can also be synthesized easily by the method described in CLARK, J. L. KaO, H (1948) J. Amer. Chem, Soc 70, 2151. For example, sodium salt of salicylic acid (including sodium salt of a salicylic acid derivative) (2 moles) and zinc chloride (1 mole) are added and mixed in a solvent, and stirred under heating, to obtain a zinc salt. However, the synthesizing method is not limited to the above described.

Specific examples of publicly known products include BONTRON X-11 (salicylic acid or an iron compound as a derivative of salicylic acid: available from Orient Chemical Industries Co., Ltd.), BONTRON E-88 (salicylic acid or an aluminum compound as a derivative of salicylic acid: available from Orient Chemical Industries Co., Ltd.), BONTRON E-101 (salicylic acid or an aluminum compound as a derivative of salicylic acid: available from Orient Chemical Industries Co., Ltd.), TN-105 (salicylic acid or a zirconium compound as a derivative of salicylic acid: available from Hodogaya Chemical Co., Ltd.), E-81 (salicylic acid or a chromium compound as a derivative of salicylic acid: available from Orient Chemical Industries Co., Ltd.), E-84 (salicylic acid or a zinc compound as a derivative of salicylic acid: available from Orient Chemical Industries Co., Ltd.), E-84S (salicylic acid or a zinc compound as a derivative of salicylic acid: available from Orient Chemical Industries Co., Ltd.), E-108 (salicylic acid or an aluminum compound as a derivative of salicylic acid: available from Orient Chemical Industries Co., Ltd.), and E-304 (salicylic acid or a zinc compound as a derivative of salicylic acid: available from Orient Chemical Industries Co., Ltd.).

It is preferable to use the metal compound of the aromatic carboxylic acid in an amount of 0.5% by mass or greater but less than 15% by mass (more preferably 1.0% by mass or greater but less than 9.0% by mass) of the toner on a mass basis. When the amount of the metal compound of the aromatic carboxylic acid is 15% by mass or greater, low-temperature fixability may be spoiled because a metal salt is exposed to the surface of the toner, and the metal compound of the aromatic carboxylic acid may partially undergo a cross-linking reaction and harden due to interactions with the resin and the release agent in the developing device or during storage in a tonner bottle. When the amount of the metal compound of the aromatic carboxylic acid is less than 0.5% by mass, resistance to a stirring stress in the developing device may be degraded due to the effect of presence of the metal compound of the aromatic carboxylic acid in the toner.

When heating during the toner production process reaches equal to or higher than the melting temperature of the binder resin, the metal compound of the aromatic carboxylic acid interacts with the resin and undergoes a cross-linking reaction. This increases a gel content in the toner. Hence, it is preferable to maintain the temperature to lower than or equal to the melting temperature of the resin during the production process.

The constituent material of the toner is not particularly limited so long as the toner satisfies the properties described above. Specific examples of the constituent material include the followings.

<Binder Resin>

The binder resin is not particularly limited so long as the binder resin is soluble in an organic solvent used, and a resin typically used may be appropriately selected and used. Examples of the binder resin include vinyl polymers of, for example, styrene-based monomers, acrylic-based monomers, and methacrylic-based monomers, copolymers formed of these monomers or formed of 2 or more kinds, polyester-based polymers, polyol resins, phenol resins, silicone resins, polyurethane resins, polyamide resins, furan resins, epoxy resins, xylene resins, terpene resins, coumarone-indene resins, polycarbonate resins, and petroleum-based resins.

The styrene-based monomers are not particularly limited and may be appropriately selected depending on the intended purpose. Examples of the styrene-based monomers include styrene such as styrene, o-methylstyrene, m-methylstyrene, p-methylstyrene, p-phenylstyrene, p-ethylstyrene, 2,4-dimethylstyrene, p-n-amylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene, and p-nitrostyrene, or derivatives of the styrene.

The acrylic-based monomers are not particularly limited and may be appropriately selected depending on the intended purpose. Examples of the acrylic-based monomers include acrylic acid and esters of acrylic acid. The esters of the acrylic acid are not particularly limited and may be appropriately selected depending on the intended purpose. Examples of the esters of the acrylic acid include methyl acrylate, ethyl acrylate, propyl acrylate, n-butyl acrylate, isobutyl acrylate, n-octyl acrylate, n-dodecyl acrylate, 2-ethylhexyl acrylate, stearyl acrylate, 2-chloroethyl acrylate, and phenyl acrylate.

The methacrylic-based monomers are not particularly limited and may be appropriately selected depending on the intended purpose. Examples of the methacrylic-based monomers include methacrylic acid and esters of methacrylic acid. The esters of the methacrylic acid are not particularly limited and may be appropriately selected depending on the intended purpose. Examples of the esters of the methacrylic acid include methyl methacrylate, ethyl methacrylate, propyl methacrylate, n-butyl methacrylate, isobutyl methacrylate, n-octyl methacrylate, n-dodecyl methacrylate, 2-ethylhexyl methacrylate, stearyl methacrylate, phenyl methacrylate, dimethylaminoethyl methacrylate, and diethylaminoethyl methacrylate.

Other monomers that form the vinyl polymers or the copolymers are not particularly limited and may be appropriately selected depending on the intended purpose. Examples of the other monomers include (1) to (18) below.

(1) Monoolefins such as ethylene, propylene, butylene, and isobutylene (2) Polyenes such as butadiene and isoprene (3) Halogenated vinyls such as vinyl chloride, vinylidene chloride, vinyl bromide, and vinyl fluoride (4) Vinyl esters such as vinyl acetate, vinyl propionate, and vinyl benzoate (5) Vinyl ethers such as vinyl methyl ether, vinyl ethyl ether, and vinyl isobutyl ether (6) Vinyl ketones such as methyl vinyl ketone, vinyl hexyl ketone, and methyl isopropenyl ketone (7) N-vinyl compounds such as N-vinyl pyrrole, N-vinyl carbazole, N-vinyl indole, and N-vinyl pyrrolidone (8) Vinyl naphthalenes (9) Derivatives of acrylic acid or methacrylic acid such as acrylonitrile, methacrylonitrile, and acrylamide

(10) Unsaturated dibasic acids such as maleic acid, citraconic acid, itaconic acid, alkenylsuccinic acid, fumaric acid, and mesaconic acid

(11) Unsaturated dibasic acid anhydrides such as maleic anhydride, citraconic anhydride, itaconic anhydride, and alkenylsuccinic anhydride

(12) Unsaturated dibasic acid monoesters such as maleic acid monomethyl ester, maleic acid monoethyl ester, maleic acid monobutyl ester, citraconic acid monomethyl ester, citraconic acid monoethyl ester, citraconic acid monobutyl ester, itaconic acid monomethyl ester, alkenylsuccinic acid monomethyl ester, fumaric acid monomethyl ester, and mesaconic acid monomethyl ester

(13) Unsaturated dibasic acid esters such as dimethyl maleic acid and dimethyl fumaric acid

(14) α,β-Unsaturated acids such as crotonic acid and cinnamic acid

(15) α,β-Unsaturated acid anhydrides such as crotonic anhydride and cinnamic anhydride

(16) Carboxyl group-containing monomers such as anhydrides of the α,β-unsaturated acids and lower fatty acids, and alkenylmalonic acid, alkenylglutaric acid, alkenyladipic acid, and anhydrides and monoesters of these acids

(17) Hydroxyalkyl esters of acrylic acid or methacrylic acid, such as 2-hydroxyethyl acrylate, 2-hydroxyethyl methacrylate, and 2-hydroxypropyl methacrylate

(18) Hydroxy group-containing monomers such as 4-(1-hydroxy-1-methylbutyl)styrene and 4-(1-hydroxy-1-methylhexyl)styrene In the toner of the present invention, the vinyl polymer or the copolymer, defined as the binder resin, may have a cross-linked structure cross-linked by a cross-linking agent containing 2 or more vinyl groups.

The cross-linking agent is not particularly limited and may be appropriately selected depending on the intended purpose. Examples of the cross-linking agent include: aromatic divinyl compounds such as divinylbenzene and divinylnaphthalene; alkyl chain-bound diacrylate compounds such as ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, and these compounds in which acrylate is replaced with methacrylate; and ether bond-containing alkyl chain-bound diacrylate compounds such as diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and these compounds in which acrylate is replaced with methacrylate.

Other examples of the cross-linking agent include diacrylate compounds and dimethacrylate compounds that are bound by a chain containing an aromatic group and an ether bond.

Examples of the cross-linking agent include polyester-type diacrylate having a product name MANDA (available from Nippon Kayaku Co., Ltd.).

Other examples of the cross-linking agent include multifunctional cross-linking agents such as pentaerythritol, trimethylolethane triacrylate, trimethylolpropane triacrylate, tetramethylolethane tetraacrylate, oligoester acrylate, these compounds in which acrylate is replaced with methacrylate, triallyl cyanurate, and triallyl trimellitate.

Among these cross-linking agents, the aromatic divinyl compounds (particularly, divinylbenzene) and the diacrylate compounds bound by a chain containing an aromatic group and one ether bond are preferable in terms of fixability and offset resistance of the resin for the toner. Among these compounds, combinations of monomers that form styrene-based copolymers and styrene-acrylic-based copolymers are preferable.

Examples of a polymerization initiator used for producing the vinyl polymer or the copolymer of the present invention include 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobisisobutyrate, 1,1'-azobis(1-cyclohexanecarbonitrile), 2-(carbamoylazo)-isobutyronitrile, 2,2'-azobis(2,4,4-trimethylpentane), 2-phenylazo-2',4'-dimethyl-4'-methoxyvaleronitrile, 2,2'-azobis(2-methylpropane), ketone peroxides such as methyl ethyl ketone peroxide, acetylacetone peroxide, and cyclohexanone peroxide, 2,2-bis(tert-butylperoxy) butane, tert-butyl hydroperoxide, cumene hydroperoxide, 1,1,3,3-tetramethylbutyl hydroperoxide, di-tert-butyl peroxide, tert-butylcumyl peroxide, dicumyl peroxide, α-(tert-butylperoxy)isopropylbenzene, isobutyl peroxide, octanoyl peroxide, decanoyl peroxide, lauroyl peroxide, 3,5,5-trimethylhexanoyl peroxide, benzoyl peroxide, m-tolyl peroxide, di-isopropylperoxy dicarbonate, di-2-ethylhexylperoxy dicarbonate, di-n-propylperoxy dicarbonate, di-2-ethoxyethylperoxy carbonate, di-ethoxyisopropylperoxy dicarbonate, di(3-methyl-3-methoxybutyl)peroxy carbonate, acetylcyclohexylsulfonyl peroxide, tert-butylperoxy acetate, tert-butylperoxy isobutyrate, tert-butylperoxy-2-ethyl hexalate, tert-butylperoxy laurate, tert-butyl-oxy benzoate, tert-butylperoxyisopropyl carbonate, di-tert-butylperoxy isophthalate, tert-butylperoxyallyl carbonate, isoamylperoxy-2-ethyl hexanoate, di-tert-butylperoxy hexahydroterephthalate, and tert-butylperoxy azelate.

When the binder resin is a styrene-acrylic-based resin, a molecular weight distribution of a tetrahydrofuran (THF)-soluble component in the resin component obtained by GPC has at least 1 peak in a molecular weight range of from 3,000 through 50,000 (converted to number average molecular weight).

The binder resin of the present invention preferably contains a vinyl-based graft polymer having a structure in which a side-chain resin (B) described below is grafted on a main-chain resin (A) described below.

The resin (A) may be any resin so long as the resin (B) can be grafted on the resin. Examples of the resin (A) include polyolefin resins and thermally degraded polyolefin resins Examples of olefins that constitute the polyolefin resins include ethylene, propylene, 1-butene, isobutylene, 1-hexene, 1-dodecene, and 1-octadecene.

Examples of the polyolefin resins include polymers of olefins, oxides of polymers of olefins, modified products of polymers of olefins, and products obtained by copolymerizing olefins with other monomers copolymerizable with olefins.

Examples of the polymers of olefins include polyethylene, polypropylene, ethylene/propylene copolymers, ethylene/1-butene copolymers, and propylene/1-hexene copolymers.

Examples of the oxides of polymers of olefins include oxides of the polymers of olefins.

Examples of the modified products of polymers of olefins include maleic acid derivative (e.g., maleic anhydride, monomethyl maleate, monobutyl maleate, and dimethyl maleate) adducts of the polymers of olefins.

Examples of the products obtained by copolymerizing olefins with other monomers copolymerizable with olefins include copolymers of olefins with monomers such as unsaturated carboxylic acids [e.g., (meth)acrylic acid, itaconic acid, and maleic anhydride] and unsaturated carboxylic acid alkyl esters [e.g., (meth)acrylic acid alkyl (C1 through C18) esters and maleic acid alkyl (C1 through C18) esters].

In the present invention, it is only needed that the polymer structure have a polyolefin structure, and it is not indispensable that the monomer have an olefin structure.

For example, polymethylene (e.g., Sasol wax) can be used.

Among these polyolefin resins, the polymers of olefins, the oxides of polymers of olefins, and the modified products of polymers of olefins are preferable, polyethylene, polymethylene, polypropylene, ethylene/propylene polymers, oxidized polyethylene, oxidized polypropylene, and maleated polypropylene are more preferable, and polyethylene and polypropylene are particularly preferable.

Examples of the monomer that constitutes the resin (B) include alkyl (containing from 1 through 5 carbon atoms) esters of unsaturated carboxylic acids [e.g., methyl (meth) acrylate, ethyl (meth)acrylate, butyl (meth)acrylate, and 2-ethylhexyl (meth)acrylate], and vinyl ester-based monomers [e.g., vinyl acetate].

Among these monomers, alkyl (meth)acrylates are preferable, and alkyl (meth)acrylates (B1) containing from 1 through 5 carbon atoms on the alkyl chain are more preferable.

Examples of an aromatic vinyl monomer (B2) used in combination with (B1) as the monomers that constitute the resin (B) include styrene-based monomers [e.g., styrene, α-methylstyrene, p-methylstyrene, m-methylstyrene, p-methoxystyrene, p-hydroxystyrene, p-acetoxystyrene, vinyltoluene, ethylstyrene, phenylstyrene, and benzylstyrene]. Among these styrene-based monomers, styrene is particularly preferable.

Examples of monomers that constitute the polyester-based polymers include the followings.

Examples of divalent alcohol components include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-pentanediol, 1,2,3,6-hexanetetrol, 1,4-sorbitan, pentaerythritols such as dipentaerythritol and trip entaerythritol, 1,2,4-butanetriol, 1,2,5-pentatriol, glycerol, 2-methylpropanetriol, 2-methyl-1,2,4-butanetriol, trimethylolethane, trimethylolpropane, and 1,3,5-trihydroxybenzene.

Combined use of a trivalent or higher polyvalent alcohol or a trivalent or higher acid allows the polyester resin to be cross-linked. However, it is needed that such an alcohol or acid be used in an amount that does not hinder the resin from being dissolved in an organic solvent.

Examples of the trivalent or higher polyvalent alcohol include sorbitol, 1,2,3,6-hexanetetrol, 1,4-sorbitan, pentaerythritols such as dipentaerythritol and trip entaerythritol, 1,2,4-butanetriol, 1,2,5-pentatriol, glycerol, 2-methylpropanetriol, 2-methyl-1,2,4-butanetriol, trimethylolethane, trimethylolpropane, and 1,3,5-trihydroxybenzene.

Examples of acid components that form the polyester-based polymers include benzene carboxylic acids such as phthalic acid, isophthalic acid, and terephthalic acid or anhydrides of the benzene carboxylic acids, alkyl dicarboxylic acids such as succinic acid, adipic acid, sebacic acid, and azelaic acid or anhydrides of the alkyl dicarboxylic acids, unsaturated dibasic acids such as maleic acid, citraconic acid, itaconic acid, alkenylsuccinic acid, fumaric acid, and mesaconic acid, and unsaturated dibasic acid anhydrides such as maleic anhydride, citraconic anhydride, itaconic anhydride, and alkenylsuccinic anhydride.

Examples of trivalent or higher multivalent carboxylic acid components include trimellitic acid, pyromellitic acid, 1,2,4-benzene tricarboxylic acid, 1,2,5-benzene tricarboxylic acid, 2,5,7-nephthalene tricarboxylic acid, 1,2,4-naphthalene tricarboxylic acid, 1,2,4-butane tricarboxylic acid, 1,2,5-hexane tricarboxylic acid, 1,3- dicarboxy-2 -methyl-2-methylenecarboxypropane, tetra(methylenecarboxy) methane, 1,2,7,8- octanetetracarboxylic acid, and empol trimer acid, or anhydrides or partially lower alkyl esters of these acids.

When the binder resin is a polyester-based resin, it is preferable that a molecular weight distribution of a THF-soluble component in the resin component have at least 1 peak in a molecular weight range of from 3,000 through 50,000 in terms of fixability and offset resistance of the toner. Further, a binder resin in which a component having a molecular weight of 100,000 or less account for from 70% through 100% of the THF-soluble component is preferable in terms of dischargeability. Furthermore, a binder resin that has at least 1 peak in a molecular weight range of from 5,000 through 20,000 is more preferable.

In the present invention, the molecular weight distribution of the binder resin is measured by gel permeation chromatography (GPC) using THF as a solvent.

When the binder resin is a polyester resin, the acid value of the binder resin is preferably from 0.1 mgKOH/g through 100 mgKOH/g, more preferably from 0.1 mgKOH/g through 70 mgKOH/g, and particularly preferably from 0.1 mgKOH/g through 50 mgKOH/g.

In the present invention, the acid value of the binder resin component of the toner composition is obtained by the method described below. The basic operation is based on JIS K-0070.

(1) The sample to be used is the binder resin (polymer component) taken out from the other additives. Alternatively, the acid values and contents of the components of the sample other than the binder resin and the cross-linked binder resin are obtained beforehand. A pulverized product of the sample is precisely weighed out in an amount of from 0.5 g through 2.0 g. The weight of the polymer component is given as W g. For example, when measuring the acid value of the binder resin from the toner, the acid values and contents of, for example, a colorant and a magnetic material are measured separately, in order to obtain the acid value of the binder resin by calculation.

(2) The sample is put in a 300 mL beaker, into which a mixture liquid (150 mL) of toluene/ethanol (at a volume ratio of 4/1) is added to dissolve the sample.

(3) Using a potentiometric titrator, the resultant is titrated with an ethanol solution of 0.1 mol/L KOH.

(4) The amount of the KOH solution used here is S (mL). At the same time, a blank is measured to obtain the amount (B mL) of the KOH solution used. The acid value is calculated according to formula (3) below, where f represents a factor of KOH.

Acid value (mgKOH/g)=[$(S-B) \times f \times 5.61$]/$W$   Formula (3)

The glass transition temperature (Tg) of the binder resin of the toner and a composition containing the binder resin is preferably from 50 degrees C. through 80 degrees C. and more preferably from 60 degrees C. through 70 degrees C. in terms of a toner storage property.

When the glass transition temperature (Tg) is lower than 50 degrees C., the toner tends to degrade in a high-temperature atmosphere. When the glass transition temperature (Tg) is higher than 80 degrees C., fixability may degrade.

<Release Agent>

The release agent is not particularly limited and may be appropriately selected depending on the intended purpose from known release agents. For example, when the toner is produced by a producing method described below, there is a need for dissolving or dispersing the toner composition in an organic solvent. Therefore, the release agent to be selected is a release agent that can dissolve in the organic solvent. Examples of the release agent include aliphatic hydrocarbon-based waxes such as low-molecular weight polyethylene, low-molecular-weight polypropylene, polyolefin waxes, microcrystalline waxes, paraffin waxes, and Sasol waxes, oxides of aliphatic hydrocarbon-based waxes such as oxidized polyethylene waxes or block copolymers of the oxides, plant waxes such as candelilla waxes, carnauba waxes, Japan waxes, and Jojoba waxes, animal waxes such as beeswaxes, lanolin, and cetaceum, mineral waxes such as ozokerite, ceresin, and petrolatum, waxes mainly formed of fatty acid esters such as montanic acid ester waxes and castor waxes, various synthetic ester waxes, and synthetic amide waxes.

Other examples of the release agent include: saturated straight-chain fatty acids such as palmitic acid, stearic acid, montanic acid, and other straight-chain alkyl group-containing straight-chain alkyl carboxylic acids; unsaturated fatty acids such as plandinic acid, eleostearic acid, and valinaric acid; saturated alcohols such as stearyl alcohol, eicosyl alcohol, behenyl alcohol, carnaupyl alcohol, ceryl alcohol, mesilyl alcohol, and other long-chain alkyl alcohols; polyvalent alcohols such as sorbitol; fatty acid amides such as linoleic acid amide, olefinic acid amide, and lauric acid amide; saturated fatty acid bisamides such as methylenebiscapric acid amide, ethylenebislauric acid amide, and hexamethylenebisstearic acid amide; unsaturated fatty acid amides such as ethylenebisoleic acid amide, hexamethylenebisoleic acid amide, N,N'-dioleylatlipic acid amide, and N,N'-dioleylsebacic acid amide; aromatic bisamides such as m-xylenebisstearic acid amide and N,N-distearylisophthalic acid amide; fatty acid metal salts such as calcium stearate, calcium laurate, zinc stearate, and magnesium stearate; waxes obtained by grafting vinyl-based monomers such as styrene and acrylic acid to aliphatic hydrocarbon-based waxes; partially esterified compounds of fatty acids and polyvalent alcohols, such as behenic acid monoglyceride; and hydroxyl group-containing methyl ester compounds obtained by hydrogenating vegetable oils.

Products obtained by imparting a sharp molecular weight distribution to these waxes or removing low-molecular-weight solid fatty acids, low-molecular-weight solid alcohols, low-molecular-weight solid compounds, and other impurities from these waxes, by a press sweating method, a solvent method, a recrystallization method, a vacuum distillation method, a supercritical gas extraction method, or a solution crystallization method are also preferable for use as the release agent.

The melting point of the release agent is preferably 65 degrees C. or higher and more preferably in the range of from 69 degrees C. through 120 degrees C. in order to balance fixability and offset resistance. When the melting point of the release agent is 65 degrees C. or higher, blocking resistance will not degrade. When the melting point of the release agent is 120 degrees C. or lower, the offset resistance effect will be expressed sufficiently.

In the present invention, the melting point of the release agent refers to the temperature of the peak top of the maximum peak among endothermic peaks of the release agent measured by differential scanning calorimetry (DSC).

A method for measuring the melting point of the release agent will be described below. The release agent can be extracted from the toner by n-hexane. For example, the release agent remaining in an aluminum cup in the above-described measurement of the amount of the release agent extracted can be used for the DSC measurement.

As the DSC measuring instrument, a high-precision inner-heat input-compensation differential scanning calorimeter is preferable. The measuring method is performed based on ASTM D3418-82. For the measurement, the temperature is raised and lowered once to obtain a previous history, and then raised at a temperature rate of 10 degrees C./minute, to obtain the temperature of the peak top observed at the moment as the melting point.

<Other Components>

The toner of the present invention may contain other components such as a colorant, a pigment dispersant, and a charge controlling agent. As other components, external additives such as a fluidity improver and a cleanability improver may also be added.

<<Colorant>>

The colorant is not particularly limited and may be appropriately selected depending on the intended purpose. Examples of the colorant include black pigments, yellow pigments, magenta pigments, and cyan pigments.

The content of the colorant is not particularly limited, may be appropriately selected depending on the intended purpose, and is preferably from 1% by mass through 15% by mass and more preferably from 3% by mass through 10% by mass of the toner.

The colorant may be used in the form of a masterbatch in which the colorant is combined with a resin. The resin used for producing the masterbatch or kneaded together with the masterbatch may be appropriately selected depending on the intended purpose, from, for example, styrene such as polystyrene, poly-p-chlorostyrene, and polyvinyl toluene and polymers of substituted styrene, in addition to the polyester resin described above.

The masterbatch can be obtained by mixing and kneading the resin for the masterbatch and the colorant under a high shear force. Here, an organic solvent can be used in order to increase the interaction between the colorant and the resin. Further, it is also preferable to use a so-called flushing method of mixing and kneading a water-containing aqueous paste of the colorant with the resin and an organic solvent to transfer the colorant to the resin, and then removing the water component and the organic solvent component, because the method can use a wet cake of the colorant as is without needing drying.

The amount of the masterbatch to be used is preferably from 0.1 parts by mass through 20 parts by mass relative to 100 parts by mass of the binder resin.

It is preferable that the resin for the masterbatch have an acid value of 30 mgKOH/g or less and an amine value of from 1 through 100 and be used in a state that the colorant is dispersed in the resin. It is more preferable that the resin for the masterbatch have an acid value of 20 mgKOH/g or less and an amine value of from 10 through 50 and be used in a state that the colorant is dispersed in the resin.

<<<Pigment Dispersant>>>

For production of the masterbatch, a pigment dispersant may be used in order to increase dispersibility of the colorant.

The pigment dispersant is not particularly limited and may be appropriately selected depending on the intended purpose from known pigment dispersants. It is preferable that the pigment dispersant have a high compatibility with the binder resin in terms of pigment dispersibility. Examples of commercially available such pigment dispersants include "AJISPER PB821" and "AJISPER PB822" (available from Ajinomoto Fine-Techno Co., Inc.), "DISPERBYK-2001" (available from Byk-Chemie GmbH), and "EFKA-4010" (available from EFKA).

When expressed as a styrene-equivalent weight by gel permeation chromatography, the weight average molecular weight of the pigment dispersant as the main-peak local maximum molecular weight is preferably from 500 through 100,000. In this range, the weight average molecular weight of the pigment dispersant is more preferably from 3,000 through 100,000, yet more preferably from 5,000 through 50,000, and particularly preferably from 5,000 through 30,000 in terms of pigment dispersibility. When the molecular weight of the pigment dispersant is less than 500, the pigment dispersant has a high polarity. This may reduce dispersibility of the colorant. When the molecular weight of the pigment dispersant is greater than 100,000, the pigment dispersant has a high affinity with a solvent. This may reduce dispersibility of the colorant.

The amount of the dispersant to be added is not particularly limited, may be appropriately selected depending on the intended purpose, and is preferably from 1 part by mass through 200 parts by mass and more preferably from 5 parts by mass through 80 parts by mass relative to 100 parts by mass of the colorant. When the amount of the dispersant to be added is less than 1 part by mass, the dispersing ability may be poor. When the amount of the dispersant to be added is greater than 200 parts by mass, chargeability may be poor.

<<Charge Controlling Agent>>

The charge controlling agent is not particularly limited and may be appropriately selected depending on the intended purpose from known charge controlling agents. Examples of the charge controlling agent include nigrosine-based dyes, triphenylmethane-based dyes, chromium-containing metal complex dyes, molybdic acid chelate pigments, rhodamine-based dyes, alkoxy-based amines, quaternary ammonium salts (including fluorine-modified quaternary ammonium salts), alkylamides, phosphorus and phosphorus compounds, tungsten or tungsten compounds, and fluorine-based active agents.

The amount of the charge controlling agents to be used is preferably from 0.1 parts by mass through 10 parts by mass and more preferably from 0.2 parts by mass through 5 parts by mass relative to 100 parts by mass of the binder resin.

<<Fluidity Improver>>

A fluidity improver may be added to the toner of the present invention.

The fluidity improver is not particularly limited and may be appropriately selected depending on the intended purpose so long as the fluidity improver can improve fluidity of the toner (facilitate flow of the toner) when added on the surface of the toner. Examples of the fluidity improver include powder silica, powder titanium oxide, and powder alumina. Surface treatment may be applied to these fluidity improvers with a silane coupling agent or a silicone oil to obtain treated silica.

<<Cleanability Improver>>

The cleanability improver is not particularly limited and may be appropriately selected depending on the intended purpose so long as the cleanability improver can improve removability of the toner remaining on an electrostatic latent image bearer or a primary transfer medium after the toner is transferred onto, for example, a recording sheet. Examples of the cleanability improver include fatty acid metal salts such as zinc stearate, calcium stearate, and stearic acid, and polymer particles produced by soap-free emulsion polymerization, such as polymethyl methacrylate particles and polystyrene particles.

(Method for Producing Toner)

A method for producing a toner of the present invention includes at least a liquid droplet forming step and a liquid droplet solidifying step, and further includes other steps as needed.

In order to obtain the toner that expresses the properties described above, the toner may be produced by a method for producing a toner, including a liquid droplet forming step of discharging a toner composition liquid obtained by dissolving or dispersing the binder resin and the release agent in an organic solvent, to form liquid droplets, and a liquid droplet solidifying step of solidifying the liquid droplets to form toner particles.

The toner of the present invention may also be produced by a method for producing a toner, including a drying step of drying the toner particles for from 30 minutes through 60 minutes at a temperature of [Tg−5 degrees C.] where Tg is the glass transition temperature of the binder resin. The toner produced through the series of steps described above is obtained from rapid solidification of the liquid droplets due to drying after formation of the liquid droplets. Therefore, there is a possibility that a stress due to volume shrinkage by drying may remain in the particles, to make the particles easily crushable upon application of a stress. Through the drying step of drying the particles for from 30 minutes through 60 minutes at a temperature of [Tg−5 degrees C.] where Tg is the glass transition temperature of the binder resin, deformation that has appeared due to the volume shrinkage can be reduced to remove the stress remaining in the particles. This makes it possible to increase the hardness of the toner particles, improve stress resistance of the toner particles, and suppress crushing of the toner particles. When the additional drying time is shorter than 30 minutes, there is a possibility that improvement of the particle hardness may be insufficient. When additional drying is performed for longer than 60 minutes, the toner particles become too hard. This inhibits low-temperature fixability.

<Liquid Droplet Forming Step>

The liquid droplet forming step is a step of discharging a toner composition liquid obtained by dissolving or dispersing the binder resin and the release agent in an organic solvent, to form liquid droplets.

The toner composition liquid contains at least the binder resin and the release agent, and can also be obtained by dissolving or dispersing a toner composition that further contains other components as needed in an organic solvent.

The organic solvent is not particularly limited and may be appropriately selected depending on the intended purpose so long as the organic solvent is a volatile one in which the toner composition in the toner composition liquid can be dissolved or dispersed and in which the binder resin and the release agent in the toner composition liquid can be dissolved without being phase-separated.

It is also possible to dissolve the release agent by heating the organic solvent and the toner composition liquid. Here, for stable, continuous discharging, the temperature of the toner composition liquid in the environmental temperature in the liquid droplet solidifying step is preferably lower than [Tb−20] degrees C. where Tb is the boiling point (degrees C.) of the organic solvent.

When the temperature of the toner composition liquid is lower than [Tb−20] degrees C., there does not occur a problem that the organic solvent evaporates to generate bubbles in a toner composition liquid chamber, or the toner composition liquid dries near the discharging holes to narrow the discharging holes. Therefore, the toner composition liquid can be discharged stably.

In order to prevent the discharging holes from being clogged, there is a need for the release agent to be in a state of being dissolved in the toner composition liquid. In order to obtain uniform toner particles, what matters is that the release agent be dissolved without being phase-separated from the binder resin dissolved in the toner composition liquid. Further, in order for releasability to be expressed during fixing to prevent offset, what matters is that the binder resin and the release agent be in a state of being phase-separated in the toner particles from which the solvent has been removed. When the release agent is not phase-separated from the binder resin, the release agent not only is not able to express releasability, but also reduces the melt viscosity and elasticity of the binder resin to make hot offset more likely to occur.

Hence, it is advisable to select the optimum release agent depending on the organic solvent and binder resin used.

<<Organic Solvent>>

The organic solvent is not particularly limited and may be appropriately selected depending on the intended purpose so long as the organic solvent is a volatile one in which the toner composition can be dissolved or dispersed. Preferable examples of the organic solvent include solvents such as ethers, ketones, esters, hydrocarbons, and alcohols. Examples of the organic solvent to be especially mentioned include tetrahydrofuran (THF), acetone, methyl ethyl ketone (MEK), ethyl acetate, toluene, and water. One of these organic solvents may be used alone or two or more of these organic solvents may be used in combination.

<<Method for Preparing Toner Composition Liquid>>

The toner composition liquid can be obtained by dissolving or dispersing the toner composition in a solvent.

For preparation of the toner composition liquid, what matters is to make the dispersion of, for example, the colorant sufficiently small compared with the opening diameter of the nozzles with, for example, a homomixer or a bead mill in order to prevent clogging of the discharging holes.

The solid component in the toner composition liquid preferably accounts for from 3% by mass through 40% by mass. When the solid component accounts for less than 3% by mass, not only productivity is low, but also the dispersion of, for example, the colorant is likely to settle or aggregate to make the composition nonuniform from toner particle to toner particle to degrade the toner quality. When the solid component accounts for greater than 40% by mass, it may be impossible to obtain a toner having a small particle diameter.

The step of discharging the toner composition liquid to form liquid droplets can be performed by making a liquid droplet discharging unit discharge liquid droplets.

<<Liquid Droplet Discharging Unit>>

The liquid droplet discharging unit is not particularly limited and may be a known liquid droplet discharging unit appropriate for the intended purpose, so long as the liquid droplets to be discharged have a narrow particle diameter distribution. Examples of the liquid droplet discharging unit include one-fluid nozzles, two-fluid nozzles, a membrane vibration-type discharging unit, a Rayleigh breakup-type discharging unit, a liquid vibration-type discharging unit, and a liquid column resonance-type discharging unit.

Examples of the membrane vibration-type discharging unit include the discharging unit described in Japanese Unexamined Patent Application Publication No. 2008-292976. Examples of the Rayleigh breakup-type discharging unit include the discharging unit described in Japanese Patent No. 4647506. Examples of the liquid vibration-type discharging unit include the discharging unit described in Japanese Unexamined Patent Application Publication No. 2010-102195.

In order to make the particle diameter distribution of the liquid droplets narrow and secure toner productivity, it is possible to utilize dropletization liquid column resonance using the liquid column resonance-type discharging unit. In the dropletization liquid column resonance, a vibration may be applied to the liquid in the liquid column resonance liquid chamber to form a standing wave by liquid column resonance, so the liquid may be discharged from a plurality of discharging holes formed at the regions corresponding to the anti-nodes of the standing wave.

<Liquid Droplet Solidifying Step>

The liquid droplet solidifying step is a step of solidifying the liquid droplets to form the toner. Specifically, the toner of the present invention can be obtained by performing a process of solidifying the liquid droplets of the toner composition liquid discharged into a gas from the liquid droplet discharging unit, then performing a collecting process.

The liquid droplet solidifying unit is a unit configured to solidify the liquid droplets to form the toner.

<<Liquid Droplet Solidifying Unit>>

The method for solidifying the liquid droplets is not particularly limited and may be appropriately selected depending on the properties of the toner composition liquid so long as the method can make the toner composition liquid solid. For example, when the toner composition liquid is one that is obtained by dissolving or dispersing the solid materials in a volatile solvent, it is possible to solidify the liquid droplets by drying the liquid droplets in a conveying airflow after the liquid droplets are jetted, i.e., by volatilizing the solvent. In drying the solvent, it is possible to adjust the dry state by appropriately selecting, for example, the temperature and vapor pressure of the gas into which the liquid droplets are jetted and the kind of the gas. Even if the solvent has not been completely dried, so long as the collected particles have maintained a solid state, the particles can be collected and then additionally dried in a different step. It is also possible to form a solidified state through, for example, a temperature change or a chemical reaction.

In the present invention, it is preferable that the dissolved release agent recrystallize during the liquid droplet solidification and grow to a sufficient size such that that the maximum release agent length Lmax in a toner particle is greater than or equal to 0.5 times as large as the maximum ferre diameter Df of the toner particle containing the release agent. As the first measure to the purpose, there is a method of drying the liquid droplets in an atmosphere adjusted to higher than or equal to [recrystallization temperature (Tc) of the release agent−5] degrees C. As the second measure, there is a method of performing drying in an environment adjusted such that the organic solvent in the toner composition liquid is at a relative humidity in a range of from 10% through 40%, even in an atmosphere lower than [recrystallization temperature (Tc) of the release agent−5] degrees C. mentioned above. However, in this case, the drying temperature needs to be higher than or equal to 40 degrees C. In any of the methods, sufficient growth of crystal domains is promoted by slowing the recrystallization speed of the release agent or the drying speed of the solvent.

Here, the recrystallization temperature of the release agent can be obtained by a DSC method. In the present invention, the peak temperature of an exothermic peak observed through heating to 150 degrees C. at a temperature raising rate of 10 degrees C./min and subsequent temperature lowering to 0 degrees C. at 10 degrees C./min is defined as the recrystallization temperature. When the atmospheric temperature is lower than [recrystallization temperature of the release agent-5 degrees C.] mentioned above, the recrystallization speed is high. This makes it difficult for a release agent having a sufficient length and branches to be formed.

When the relative humidity of the organic solvent in the toner composition liquid is lower than 10% in the second measure, likewise, the drying speed of the organic solvent is high. This is not preferable because recrystallization of the release agent is promoted to make it likely that relatively small domains of the release agent will be formed. On the other hand, when the relative humidity is higher than or equal to 40%, the drying speed of the organic solvent is considerably low. This promotes coalescing/gathering of the toner particles during drying, to make it difficult to obtain a toner having a desired particle size distribution.

<<<Solidified Particle Collecting Unit>>>

The solidified particles can be collected from the gas with a known particle collecting unit such as cyclone collection and a back filter.

Figure 4:
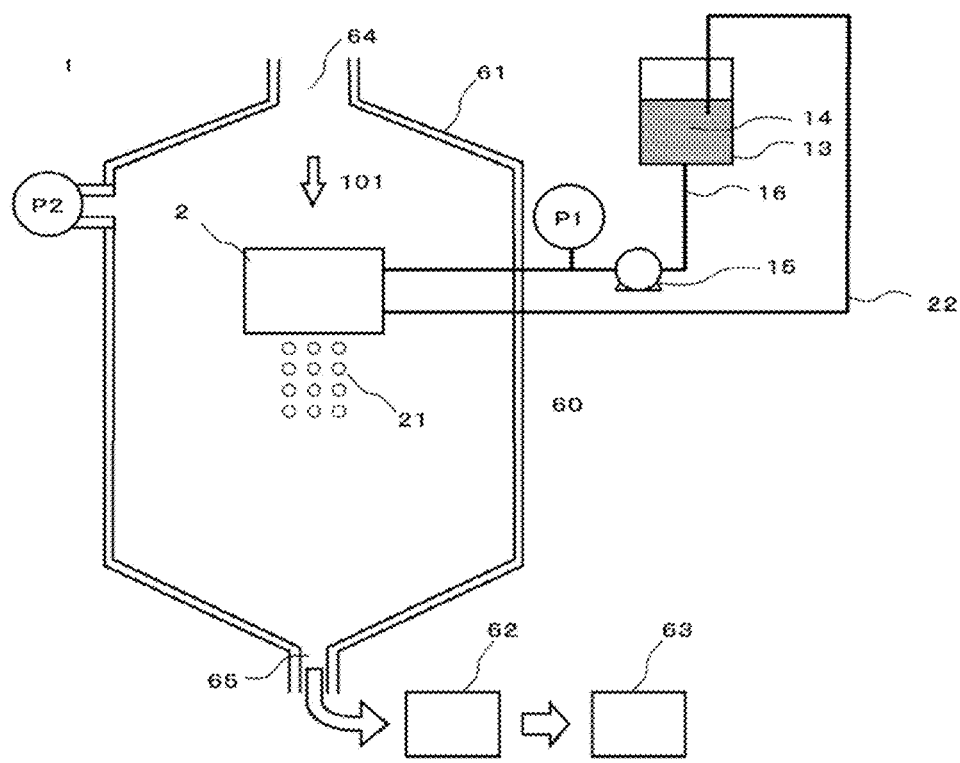
FIG. 4 is a schematic cross-sectional view illustrating an example of a toner producing apparatus.

FIG. 4 is a cross-sectional view illustrating an example of an apparatus that performs the method for producing a toner of the present invention. A toner producing apparatus 1 includes a liquid droplet discharging unit 2 and a drying/collecting unit 60.

A material storing vessel 13 storing a toner composition liquid 14, and a liquid circulating pump 15 configured to pump the toner composition liquid 14 present in a liquid supplying tube 16 in order to supply the toner composition liquid 14 stored in the material storing vessel 13 to the liquid droplet discharging unit 2 through the liquid supplying tube 16 and return the toner composition liquid 14 to the material storing vessel 13 through a liquid returning tube 22 are linked to the liquid droplet discharging unit 2. The toner composition liquid 14 can be supplied to the liquid droplet discharging unit 2 any time. The liquid supplying tube 16 is provided with a pressure gauge P1, and the drying/collecting unit is provided with a pressure gauge P2. The pressure at which the liquid is sent to the liquid droplet discharging unit 2 and the pressure in the drying/collecting unit are managed by the pressure gauges P1 and P2. Here, when a relationship of P1>P2 is established, there is a risk that the toner composition liquid 1 may leak through discharging outlets 19. When a relationship of P1<P2 is established, there is a risk that a gas may be let in to the discharging unit to stop discharging. Therefore, a relationship of P1≈P2 is desirable.

In a chamber 61, a descending airflow (conveying airflow) 101 generated through a conveying airflow inlet 64 is formed. Liquid droplets 21 discharged from the liquid droplet discharging unit 2 are conveyed downward not only by the gravity but also by the conveying airflow 101 and collected by a solidified particle collecting unit 62.

—Conveying Airflow—

The following points of the conveying airflow may also be taken into consideration.

When jetted liquid droplets contact each other before dried, the liquid droplets coalesce and form one particle (hereinafter, this phenomenon may also be referred to as "coalescing"). In order to obtain solidified particles having a uniform particle size distribution, there is a need that jetted liquid droplet be at a distance. However, jetted liquid droplets, which have a predetermined initial velocity though, eventually slow down due to air resistance. The sloweddown particles are caught up with by liquid droplets jetted afterwards, to coalesce as a result. Because this phenomenon occurs on a regular basis, these particles have a significantly bad particle diameter distribution when collected. In order to prevent coalescing, there is a need for preventing slowing of the speed of the liquid droplets and conveying, and at the same time, solidifying the liquid droplets with the conveying airflow 101 while keeping the liquid droplets from contacting each other to prevent coalescing. Finally, the solidified particles are conveyed to the solidified particle collecting unit 62.

Figure 3:
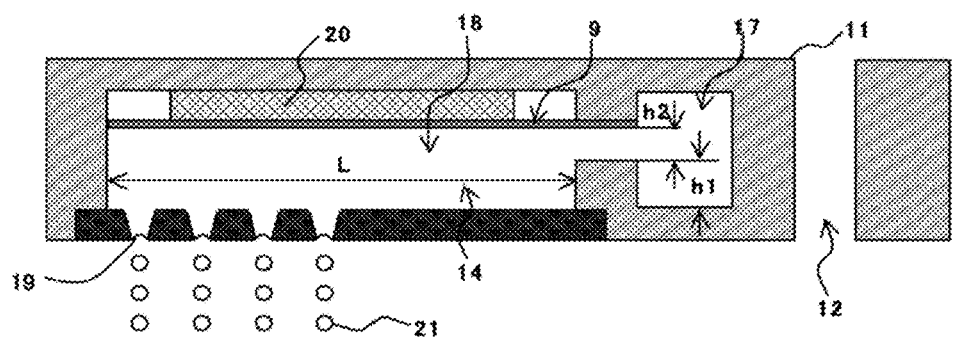
FIG. 3 is a schematic cross-sectional view illustrating an example of a liquid column resonance liquid droplet forming unit.
Figure 5:
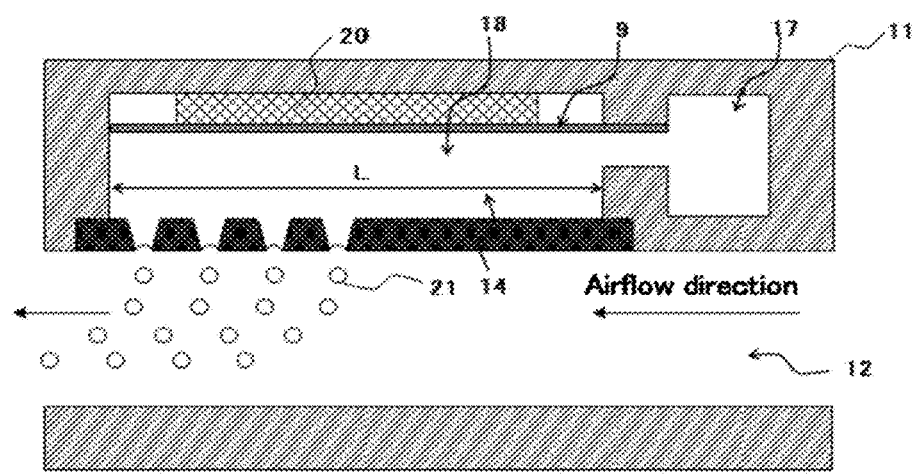
FIG. 5 is a schematic cross-sectional view illustrating an example of a liquid column resonance liquid droplet forming unit.

As illustrated in FIG. 3, for example, part of the conveying airflow 101 may be positioned as a first airflow near the liquid droplet discharging unit in the same direction as the liquid droplet discharging direction. This can prevent coalescing by preventing slowing of the speed of the liquid droplets immediately after the liquid droplets are discharged. Alternatively, as illustrated in FIG. 5, the airflow may be transversal to the discharging direction. Yet alternatively, the airflow may be at an angle, although this examples is not illustrated. It is preferable that the airflow be at an angle that makes the liquid droplets go apart from the liquid droplet discharging unit. When a coalescing preventing airflow is applied in a direction transversal to liquid droplet discharging as in FIG. 5, it is preferable that the coalescing preventing airflow be in a direction that does not make the liquid droplets follow the same trajectory when conveyed by the coalescing preventing airflow from the discharging outlets.

After coalescing is prevented by the first airflow as described above, the solidified particles may be conveyed to the solidified particle collecting unit by a second airflow.

It is preferable that the speed of the first airflow be equal to or higher than the liquid droplet jetting speed. When the speed of the coalescing preventing airflow is lower than the liquid droplet jetting speed, it is difficult for the coalescing preventing airflow to perform the intended function of preventing the liquid droplets from contacting each other.

The first airflow may be additionally conditioned so as to prevent the liquid droplets from contacting each other, and needs not indispensably be the same as the second airflow. It is also possible to mix a chemical substance that promotes solidification of the surface of the particles in the coalescing preventing airflow, or to apply a physical effect.

The conveying airflow 101 is not particularly limited to the airflow state, and may be a laminar flow, a swirling flow, or turbulence. The kind of the gas constituting the conveying airflow 101 is not particularly limited, and it is possible to use air or a noninflammable gas such as nitrogen. The temperature of the conveying airflow 101 may be adjusted appropriately, and it is preferable that the temperature of the conveying airflow 101 not fluctuate during the production. A unit configured to change the airflow condition of the conveying airflow 101 may be provided in the chamber 61. The conveying airflow 101 may be used not only for preventing coalescing of the liquid droplets 21 but for preventing adherence of the liquid droplets 21 to the chamber 61.

—Secondary Drying—

The method for producing a toner of the present invention may also include a secondary drying step.

For example, when the amount of the residual solvent contained in the toner particles obtained by the solidified particle collecting unit 62 illustrated in FIG. 4 is large, secondary drying is performed as needed to reduce the residual solvent.

The secondary drying is not particularly limited, and may use a common known drying unit such as fluidized bed drying and vacuum drying.

—Additional Drying—

Because deformation due to volume shrinkage remains in the toner particles obtained after the secondary drying, it is preferable to perform additional drying. The additional drying is not particularly limited, and may use a common known drying unit such as fluidized bed drying and vacuum drying.

(Developer)

A developer of the present invention contains at least the toner of the present invention, and further contains other components such as a carrier as needed.

<Carrier>

The carrier is not particularly limited and may be appropriately selected depending on the intended purpose. Examples of the carrier include carriers of, for example, ferrite and magnetite and a resin-coated carrier.

The resin-coated carrier is formed of carrier core particles and a resin coating material, which is a resin for covering (coating) the surface of the carrier core particles.

The volume resistance value of the carrier is not particularly limited, may be set by appropriate adjustment depending on, for example, roughness of the surface of the carrier and the amount of the coating resin, and is preferably from $10^6 \log(\Omega \cdot cm)$ through $10^{10} \log(\Omega \cdot cm)$.

The average particle diameter of the carrier is not particularly limited, may be appropriately selected depending on the intended purpose, and is preferably from 4 micrometers through 200 micrometers.

(Toner Stored Unit)

A toner stored unit of the present invention refers to a unit that has a function for storing a toner and in which a toner is stored. Examples of the form of the toner stored unit include a toner stored container, a developing device, and a process cartridge.

The toner stored container refers to a container in which a toner is stored.

The developing device refers to a device in which a toner is stored and that has a developing unit.

The process cartridge refers to an integrated body in which at least an electrostatic latent image bearer (also referred to as image bearer) and a developing unit are integrated, in which a toner is stored, and that is attachable to and detachable from an image forming apparatus. The process cartridge may further include at least one selected from the group consisting of a charging unit, an exposing unit, and a cleaning unit.

When image formation is performed with an image forming apparatus to which the toner stored unit of the present invention is attached, high-quality, highly accurate images with a long-term image stability can be formed, with advantage taken of the features of the toner that is excellent in offset resistance, charge stability, stress resistance, and background smear, and can provide highly accurate, high-quality images for a long term.

(Image Forming Apparatus and Method for Forming Image)

An image forming apparatus of the present invention includes at least an electrostatic latent image bearer, an electrostatic latent image forming unit, and a developing unit, and further includes other units as needed.

A method for forming an image of the present invention includes at least an electrostatic latent image forming step and a developing step, and further includes other steps as needed.

The method for forming an image can be favorably performed by the image forming apparatus. The electrostatic latent image forming step can be favorably performed by the electrostatic latent image forming unit. The developing step can be favorably performed by the developing unit. The other steps can be favorably performed by the other units.

The image forming apparatus of the present invention more preferably includes: an electrostatic latent image bearer; an electrostatic latent image forming unit configured to form an electrostatic latent image on the electrostatic latent image bearer; a developing unit including a toner and configured to develop the electrostatic latent image formed on the electrostatic latent image bearer with the toner to form a toner image; a transfer unit configured to transfer the toner image formed on the electrostatic latent image bearer onto a surface of a recording medium; and a fixing unit configured to fix the toner image transferred onto the surface of the recording medium.

The toner described above is used in the developing unit. It is preferable to form the toner image with a developer that contains the toner and further contains other components such as a carrier as needed.

<Electrostatic Latent Image Bearer>

The material, structure, and size of the electrostatic latent image bearer are not particularly limited and may be appropriately selected from known ones. In terms of material, examples include inorganic photoconductors formed of, for example, amorphous silicon and selenium, and organic photoconductors formed of, for example, polysilane and phthalopolymethine. Among these examples, amorphous silicon is preferable because amorphous silicon has a long life.

<Electrostatic Latent Image Forming Unit>

The electrostatic latent image forming unit is not particularly limited and may be appropriately selected depending on the intended purpose so long as the electrostatic latent image forming unit is a unit configured to form an electrostatic latent image on the electrostatic latent image bearer. Examples of the electrostatic latent image forming unit include a unit that includes at least a charging member configured to charge the surface of the electrostatic latent image bearer and an exposing member configured to expose the surface of the electrostatic latent image bearer to light imagewise.

—Charging Member and Charging—

The charging member is not particularly limited and may be appropriately selected depending on the intended purpose. Examples of the charging member include contact chargers known per se and including, for example, conductive or semiconductive rollers, brushes, films, and rubber blades, and contactless chargers utilizing corona discharge, such as corotrons and scorotrons.

For example, the charging can be performed by applying a voltage to the surface of the electrostatic latent image bear with the charging member.

As the shape of the charging member, the charging member may be in any form such as a roller, a magnetic brush, and a fur brush. The shape of the charging member may be selected depending on the specifications and form of the image forming apparatus.

The charging member is not limited to a charging member of the contact type. However, it is preferable to use a charging member of the contact type because an image forming apparatus with less ozone emission from the charging member can be obtained.

—Exposing Member and Exposing—

The exposing member is not particularly limited and may be appropriately selected depending on the intended purpose so long as the exposing member can expose the surface of the electrostatic latent image bearer charged with the charging member to light imagewise as the image to be formed. Examples of the exposing member include various exposing members such as a copier optical system, a rod lens array system, a laser optical system, and a liquid crystal shutter optical system.

The light source used for the exposing member is not particularly limited and may be appropriately selected depending on the intended purpose. Examples of the light source include all kinds of light emitting products such as a fluorescent lamp, a tungsten lamp, a halogen lamp, a mercury lamp, a sodium-vapor lamp, a light emitting diode (LED), a laser diode (LD), and electroluminescence (EL).

For irradiation with only light in a desired wavelength range, various filters such as a sharp cut filter, a band pass filter, a near-infrared cut filter, a dichroic filter, an interference filter, and a color conversion filter may be used.

For example, the exposing can be performed by exposing the surface of the electrostatic latent image bearer to light imagewise with the exposing member.

In the present invention, a backlighting system configured to expose the electrostatic latent image bearer to light imagewise from the side of the back surface of the electrostatic latent image bearer may also be employed.

<Developing Unit>

The developing unit is not particularly limited and may be appropriately selected depending on the intended purpose so long as the developing unit is a developing unit including a toner and configured to develop the electrostatic latent image formed on the electrostatic latent image bearer to form a visible image.

As the developing unit, a developing device that includes: a stirring device configured to triboelectrically charge the toner by stirring; and a developer bearer including a magnetic field generating unit secured inside and capable of rotating while bearing on the surface, a developer containing the toner is preferable.

<Other Units>

Examples of the other units include a transfer unit, a fixing unit, a cleaning unit, a charge eliminating unit, a recycling unit, and a controlling unit.

—Transfer Unit—

The transfer unit is not particularly limited and may be appropriately selected depending on the intended purpose so long as the transfer unit is a unit configured to transfer a visible image onto a recording medium. In a preferable form, the transfer unit includes a primary transfer unit configured to transfer visible images onto an intermediate transfer medium to form a combined transferred image, and a secondary transfer unit configured to transfer the combined transferred image onto a recording medium.

When the image to be secondarily transferred onto the recording medium is a color image formed of a plurality of colors of toners, the transfer unit may sequentially overlay the toners of the colors on the intermediate transfer medium to form an image on the intermediate transfer medium, and the intermediate transfer unit may secondarily transfer the image on the intermediate transfer medium collectively onto the recording medium.

The intermediate transfer medium is not particularly limited and may be appropriately selected from known transfer media depending on the intended purpose. Preferable examples of the intermediate transfer medium include a transfer belt.

The transfer unit (the primary transfer unit and the secondary transfer unit) preferably includes at least a transfer device configured to cause the visible image formed on the photoconductor to be charged by being peeled toward the recording medium. Examples of the transfer device include a corona transfer device using a corona discharge, a transfer belt, a transfer roller, a pressure transfer roller, and an adhesive transfer device.

The recording medium, which is representatively plain paper, is not particularly limited and may be appropriately selected depending on the intended purpose so long as a developed, unfixed image can be transferred onto the recording medium. Usable examples of the recording medium also include a PET base for OHP.

—Fixing Unit—

The fixing unit is not particularly limited and may be appropriately selected depending on the intended purpose so long as the fixing unit is a unit configured to fix a transferred image transferred onto the recording medium. A known heating/pressurizing member is preferable. Examples of the heating/pressurizing member include combination of a heating roller and a pressurizing roller and combination of a heating roller, a pressurizing roller, and an endless belt.

The fixing step is not particularly limited and may be appropriately selected depending on the intended purpose so long as the fixing step is a step of fixing a visible image transferred onto the recording medium. For example, the fixing step may be performed each time a toner of any color is transferred onto the recording medium, or may be performed simultaneously on toners of respective colors in an overlaid state.

The fixing step can be performed by the fixing unit.

Typically, heating by the heating/pressurizing member is preferably at from 80 degrees C. through 200 degrees C.

In the present invention, for example, a known optical fixing device may be used together with, or instead of the fixing unit depending on the intended purpose.

The surface pressure in the fixing step is not particularly limited, may be appropriately selected depending on the intended purpose, and is preferably from 10 $N/cm^2$ through 80 $N/cm^2$.

—Cleaning Unit—

The cleaning unit is not particularly limited and may be appropriately selected depending on the intended purpose so long as the cleaning unit is a unit capable of removing the toner remaining on the photoconductor. Examples of the cleaning unit include a magnetic brush cleaner, an electrostatic brush cleaner, a magnetic roller cleaner, a blade cleaner, a brush cleaner, and a web cleaner. —Charge Eliminating Unit—

The charge eliminating unit is not particularly limited and may be appropriately selected depending on the intended purpose so long as the charge eliminating unit is a unit configured to apply a charge eliminating bias to the photoconductor to eliminate charges. Examples of the charge eliminating unit include a charge eliminating lamp.

—Recycling Unit—

The recycling unit is not particularly limited and may be appropriately selected depending on the intended purpose so long as the recycling unit is a unit configured to recycle the toner removed in the cleaning step to the developing device. Examples of the recycling unit include a known conveying unit.

Figure 6:
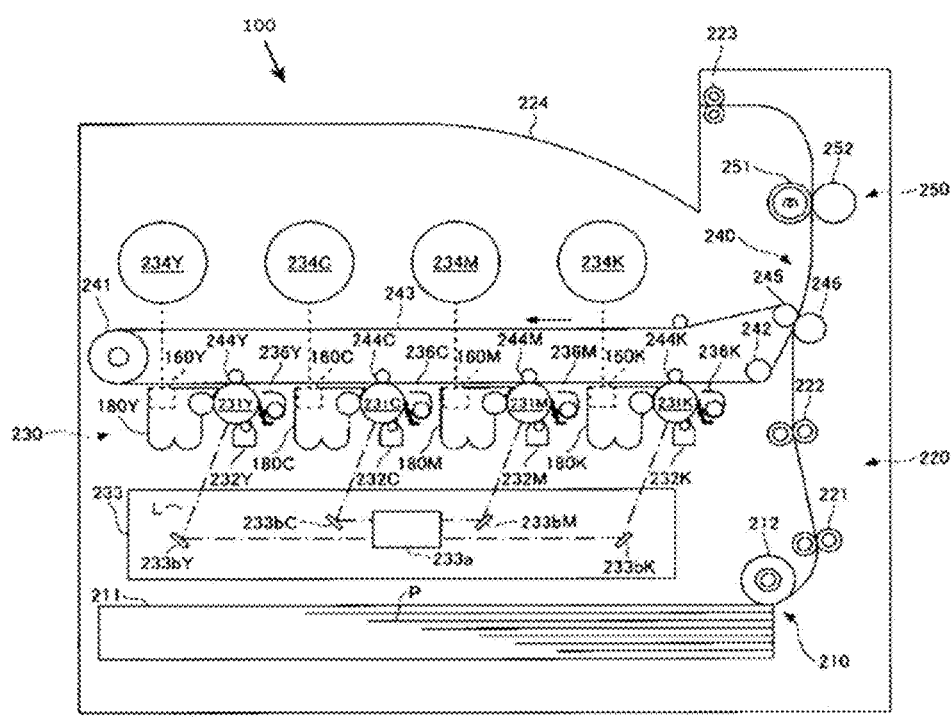
FIG. 6 is a schematic configurational view illustrating an example of an image forming apparatus of the present invention.

Next, one mode for performing the method for forming an image with the image forming apparatus of the present invention will be described with reference to FIG. 6.

An image forming apparatus 100 is a printer. However, the image forming apparatus is not particularly limited and may be, for example, a copier, a facsimile machine, and a multifunction peripheral so long as the image forming apparatus can form an image with a toner.

The image forming apparatus 100 includes a paper feeding unit 210, a conveying unit 220, an image forming unit 230, a transfer unit 240, and a fixing device 250.

The paper feeding unit 210 includes a paper feeding cassette 211 on which paper sheets P to be fed are stacked, and a paper feeding roller 212 configured to feed the paper sheets P stacked on the paper feeding cassette 211 one by one.

The conveying unit 220 includes a roller 221 configured to convey a paper sheet P fed by the paper feeding roller 212 in a direction toward the transfer unit 240, a pair of timing rollers 222 configured to be on standby nipping the leading end of the paper sheet P conveyed by the roller 221 and send out the paper sheet to the transfer unit 240 at a predetermined timing, and a paper ejecting roller 223 configured to eject a paper sheet P on which a color toner image has been fixed onto a paper ejecting tray 224.

The image forming unit 230 includes from the left to the right of the drawing sequentially at predetermined intervals, an image forming unit Y configured to form an image with a developer containing a yellow toner, an image forming unit C using a developer containing a cyan toner, an image forming unit M using a developer containing a magenta toner, and an image forming unit K using a developer containing a black toner, and include an exposing device 233.

When an arbitrary image forming unit of the image forming units (Y, C, M, and K) is to be mentioned, the image forming unit will be referred to as image forming unit.

The developer contains a toner and a carrier.

The 4 image forming units (Y, C, M, and K) are only different in the developers used, and have substantially the same mechanical configuration.

The transfer unit 240 includes a driving roller 241 and a driven roller 242, an intermediate transfer belt 243 rotatable counterclockwise in the drawing along with driving by the driving roller 241, primary transfer rollers (244Y, 244C, 244M, and 244K) provided to face photoconductor drums 231 via the intermediate transfer belt 243, and a secondary facing roller 245 and a secondary transfer roller 246 provided to face each other via the intermediate transfer belt 243 at a position at which a toner image is transferred onto a paper sheet.

The fixing device 250 includes a pressurizing roller 252 configured to form a nip by pressurizing a fixing belt 251, which is internally provided with a heater and configured to heat a paper sheet P, in a manner that the pressurizing roller 252 is rotatable with respect to the fixing belt 251. Hence, heat and pressure are applied to a color toner image on a paper sheet P to fix the color toner image. The paper sheet P on which the color toner image is fixed is ejected by the paper ejecting roller 223 onto the paper ejecting tray 224. In this way, a series of image forming process is completed.

<Process Cartridge>

A process cartridge of the present invention is formed in a form attachable to and detachable from various image forming apparatuses, and includes at least a photoconductor configured to bear an electrostatic latent image, and a developing unit configured to develop the electrostatic latent image borne on the photoconductor with the developer of the present invention to form a toner image. The process cartridge of the present invention may further include other units as needed.

The developing unit includes at least a developer stored unit in which the developer of the present invention is stored, and a developer bearer configured to bear and convey the developer stored in the developer stored unit. The developing unit may further include, for example, a regulating member configured to regulate the thickness of the developer to be borne.

Figure 7:
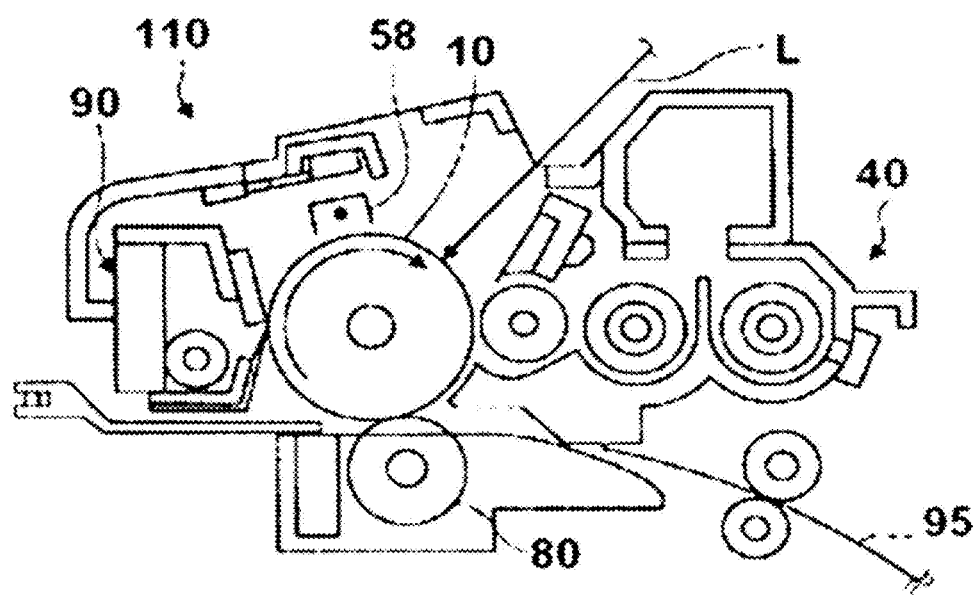
FIG. 7 is a schematic configurational view illustrating an example of a process cartridge.

FIG. 7 illustrates an example of the process cartridge of the present invention. The process cartridge 110 includes a photoconductor drum 10, a corona charger 58, a developing device 40, a transfer roller 80, and a cleaning device 90.

EXAMPLES

The present invention will be more specifically described below by way of Examples and Comparative Examples. The present invention should not be construed as being limited to these Examples. "Part" represents "part by mass".

(Release Agent)
<Synthesis Examples of Waxes (alkyl monoester Compounds) as Release Agents 1 to 5>

Synthesis Example 1

Stearic acid (special grade chemical, available from Kishida Chemical Co., Ltd.) (284 g) (1 mol), stearyl alcohol (special grade chemical, available from Kishida Chemical Co., Ltd.) (256 g) (1 mol), and sulfuric acid (20 mL) were put in a round-bottom flask equipped with a stirrer and a condenser and heated to reflux at 130 degrees C. for 4 hours while produced water was evaporated. The obtained product was refined with dimethyl ether, to obtain [wax (1)].

Synthesis Example 2

Behenic acid (EP grade chemical, available from Tokyo Chemical Industry Co., Ltd.) (340 g) (1 mol), cetyl alcohol (special grade chemical, available from Kishida Chemical Co., Ltd.) (242 g) (1 mol), and sulfuric acid (20 mL) were put in a round-bottom flask equipped with a stirrer and a condenser and heated to reflux at 130 degrees C. for 4 hours while produced water was evaporated. The obtained product was refined with diisopropyl ether, to obtain [wax (2)].

Synthesis Example 3

Behenic acid (EP grade chemical, available from Tokyo Chemical Industry Co., Ltd.) (340 g) (1 mol), stearyl alcohol (special grade chemical, available from Kishida Chemical Co., Ltd.) (256 g) (1 mol), and sulfuric acid (20 mL) were put in a round-bottom flask equipped with a stirrer and a condenser and heated to reflux at 150 degrees C. for 5 hours while produced water was evaporated. The obtained product was refined with diisopropyl ether, to obtain [wax (3)].

Synthesis Example 4

Behenic acid (EP grade chemical, available from Tokyo Chemical Industry Co., Ltd.) (340 g) (1 mol), eicosanol (EP grade, available from Tokyo Chemical Industry Co., Ltd.) (284 g) (1 mol), and sulfuric acid (20 mL) were put in a round-bottom flask equipped with a stirrer and a condenser and heated to reflux at 200 degrees C. for 5 hours while produced water was evaporated. The obtained product was refined with diisopropyl ether, to obtain [wax (4)].

Synthesis Example 5

Stearic acid (special grade chemical, available from Kishida Chemical Co., Ltd.) (284 g) (1 mol), cetyl alcohol (special grade chemical, available from Kishida Chemical Co., Ltd.) (242 g) (1 mol), and sulfuric acid (20 mL) were put in a round-bottom flask equipped with a stirrer and a condenser and heated to reflux at 200 degrees C. for 5 hours while produced water was evaporated. The obtained product was refined with diisopropyl ether, to obtain [wax (5)].

The properties of the synthetic ester waxes (1) to (5) obtained above are as presented in Table 1 below.

TABLE 1

| Wax | Melting point (degrees C.) | Recrystallization temperature (degrees C.) |
| --- | --- | --- |
| Wax 1 | 62.6 | 52.7 |
| Wax 2 | 70.3 | 64.1 |
| Wax 3 | 75.2 | 64.3 |
| Wax 4 | 67.4 | 60.5 |
| Wax 5 | 71.7 | 64.5 |
| Wax 6 | 74.1 | 70.1 |

Example 1

<Production of Toner 1>
Preparation of Colorant Dispersion Liquid—
First, as a colorant, a carbon black dispersion liquid was prepared.
Carbon black (REGAL 400, available from Cabot Corporation) (20 parts) and a pigment dispersant (AJISPER PB821, available from Ajinomoto Fine-Techno Co., Inc.) (2 parts) were primarily dispersed in ethyl acetate (78 parts) with a mixer including a stirring blade. The obtained primary dispersion liquid was dispersed more finely with DYNO-MILL under a strong shear force, to prepare a secondary dispersion liquid from which aggregates were completely removed. Further, the secondary dispersion liquid was passed through a polytetrafluoroethylene (PTFE) filter having fine pores of 0.45 micrometers (FLUORINERT MEMBRANE FILTER FHLP09050, available from Nippon Millipore Ltd.), to prepare a carbon black dispersion liquid, which was dispersed to a submicron region.
—Preparation of Toner Composition Liquid—
[Wax 1] as a release agent (20 parts), a release agent dispersant (2 parts), and [polyester resin A] as a binder resin (263.3 parts) were mixed and dissolved in ethyl acetate (676.7 parts) at 70 degrees C. with a mixer including a stirring blade. As the release agent dispersant, a product obtained by grafting a styrene-butyl acrylate copolymer to a polyethylene release agent was used. [Wax 1] and [polyester resin A] were both dissolved transparently in ethyl acetate without being phase-separated. After dissolution, the liquid temperature was adjusted to 55 degrees C. To the resultant, the carbon black dispersion liquid (100 parts) was further mixed. The resultant was stirred for 10 minutes, to prepare a toner composition liquid.
[Wax 1] was a synthetic amide wax having a melting point of 62.6 degrees C. and a recrystallization temperature of 52.7 degrees C. (available from NOF Corporation).
[Polyester resin A] was a binder resin formed of terephthalic acid, isophthalic acid, succinic acid, ethylene glycol, and neopentyl glycol and having a weight average molecular weight of 24,000 and Tg of 65 degrees C.
The weight average molecular weight Mw of the binder resin was measured with a gel permeation chromatography (GPC) measuring instrument GPC-150C (available from Waters) based on a THF-dissolved component in the binder resin. Columns used were KF801 to 807 (available from Shodex Corporation). A detecting device used was a RI (refractive index) detector. The boiling point of ethyl acetate was 76.8 degrees C.
<Production of Toner>
With the toner producing apparatus of FIG. 4 including the liquid droplet discharging unit illustrated in FIG. 3, liquid droplets of the toner composition liquid A prepared above were discharged under the conditions described below. After liquid droplets were discharged, the liquid droplets were dried and solidified by the liquid droplet solidifying unit using dry nitrogen, collected by cyclone collection, and further dried by air blowing at 35 degrees C.

at 90% RH for 48 hours and at 40 degrees C. at 50% RH for 24 hours, to produce a toner base particle intermediate product. The obtained toner base particle intermediate product was further dried by air blowing in an environment of 60 degrees C. for 30 minutes, to obtain toner base particles.

The temperatures of the toner composition liquid and of the members of the toner producing apparatus contacted by the toner composition liquid were controlled at 55 degrees C. Toner production was performed for 6 hours continuously, with no clogging of the discharging holes.

[Toner Producing Conditions]

Longer-direction length L of liquid column resonance liquid chamber: 1.85 mm

Opening portions of discharging holes: a diameter of 8.0 micrometers

Drying temperature (nitrogen): 60 degrees C.

Relative humidity of ethyl acetate (in nitrogen stream): 8%

Drive frequency: 340 kHz

Voltage applied to piezoelectric element: 10.0 V

Next, commercially available silica powders NAX50 [available from Nippon Aerosil Co., Ltd.; with an average primary particle diameter of 30 nm] (2.8 parts) and H20TM [available from Clariant AG; with an average primary particle diameter of 20 nm] (0.9 parts) were mixed with the toner base particles (100 parts) with a Henschel mixer. Next, the resultant was passed through a sieve with a mesh size of 60 micrometers to remove coarse particles and agglomerates, to obtain [toner 1].

By the measuring methods described above, the average aspect ratio, the release agent content (part by mass) by a DSC method, the Lmax value (micrometers), the ferre diameter (DF) value (micrometers), and the toner displacement amount (nm) by a microcompression test were obtained from [toner 1]. The measurement results are presented in Table 2-1.

The kinds of the wax and resin used for toner production, and the toner producing conditions are also presented in Table 2-1.

<Production of Developer>

The obtained toner 1 (4 parts) and a magnetic carrier described below (96.0 parts) were mixed with a ball mill, to produce a developer.

—Production of Carrier—

Silicone resin (organo straight silicone): 100 parts by mass

Toluene: 100 parts by mass

γ-(2-Aminoethyl)aminopropyl trimethoxysilane: 5 parts by mass

Carbon black: 10 parts by mass

The mixture was subjected to dispersion for 20 minutes using a homomixer, to prepare a coat layer forming liquid. The coat layer forming liquid was coated on the surface of spherical magnetite having a particle diameter of 50 micrometers (1,000 parts by mass) with a fluidized bed coater, to obtain a magnetic carrier.

With an image forming apparatus using the developer containing [toner 1], a cold offset property, image stability, and crushability were evaluated in the evaluation manners described below. The results are presented in Table 3-1.

<Cold Offset Property>

With a commercially available copier IMAGEO NEO C600 available from Ricoh Company, Ltd. a rectangular image of 3 cm×5 cm was formed on an A4-size sheet (T6000 70W long grain, available from Ricoh Company, Ltd.) at a position of 5 cm from the leading end of the sheet surface, in a manner that the developer was attached in an amount of 0.85 mg/cm$^2$, to produce a toner sample. Then, with a fixing member controlled at a temperature of 130 degrees C. constantly, the image was fixed at a linear velocity of 300 mm/sec (the toner weight was calculated from the weights of the sheet before and after the image was output). Presence or absence of occurrence of offset at 130 degrees C. was judged according to evaluation criteria based on visual observation by the testing person.

[Evaluation Criteria]

A: No cold offset occurred.

B: Minute cold offset was observed, but at 3 or less positions.

C: Minute cold offset occurred at more than 3 positions.

D: Cold offset occurred.

<Image Stability Evaluation>

With a commercially available copier (IMAGIO NEO 455, available from Ricoh Company, Ltd.) loaded with the developer, a continuous running test was performed on 50,000 sheets of TYPE 6000 PAPER available from Ricoh Company, Ltd. at a printing rate at which an image occupation rate was 7%. The image qualities (image density and thin line reproducibility) on the 50,000$^{th}$ sheet were evaluated according to the criteria described below.

[Evaluation Criteria]

A: A favorable image comparable to the initial images was obtained on the 50,000$^{th}$ sheet.

B: In respect of any of the evaluation items of image density and thin line reproducibility, change from the initial images occurred, but the change was in a tolerable range.

C: In respect of any of the evaluation items of image density and thin line reproducibility, an obvious change from the initial images occurred, and the change was not tolerable.

<Crushability Evaluation>

A commercially available copier (RICOH MP C6502 available from Ricoh Company, Ltd.) was loaded with the developer (650 g) and set such that the developing unit would only drive without printing images. Then, the developing unit was caused to perform idle stirring for 20 hours, to produce a deteriorated agent.

<<Measurement of Small Particle Ratio>>

The toner was separated from the stirred deteriorated agent in the manner described below, and measured with FPIA-3000. A small particle ratio was a number frequency of toner particles of 3.5 micrometers or less. The difference in small particle ratio between the initial toner and the deteriorated toner was represented as Asmall particle ratio. A toner having a high stress resistance has a small Asmall particle ratio, and a toner having a low stress resistance has a large Asmall particle ratio due to crushing.

—Method for Separating the Toner from the Agent After Adherence Evaluation—

The deteriorated agent was weighed out in 2 g in a vial.

DRYWELL (available from Fujifilm Corporation) diluted 3-fold with ion-exchanged water was weighed out in 1 g and put in the vial.

Ion-exchanged water was weighed out in 15 g and put in the vial.

The vial was put in an ultrasonic cleaner and subjected to dispersion for 1 minute.

A magnet was applied on the bottom of the vial, and the supernatant was extracted to another vial with a syringe.

The magnet was again applied on the bottom of the vial into which the extracted supernatant was poured, and the supernatant was collected with a syringe, to measure the toner particles with FPIA-3000.

[Evaluation Criteria]
A: The Asmall particle ratio was less than 1%.
B: The Asmall particle ratio was 1% or greater but less than 5%.
C: The Asmall particle ratio was 5% or greater but less than 10%.
D: The Asmall particle ratio was 10% or greater.

Example 2

[Toner 2] was obtained in the same manner as in Example 1, except that unlike in Example 1, [wax 2] was used as the release agent instead of [wax 1].

[Wax 2] was a synthetic ester wax having a melting point of 70.3 degrees C. and a recrystallization temperature of 64.1 degrees C. (available from Nippon Seiro Co., Ltd.). [Wax 2] and [polyester resin A] were both dissolved transparently in ethyl acetate without being phase-separated.

While the temperatures of the toner composition liquid and of the members of the toner producing apparatus contacted by the toner composition liquid were controlled at 55 degrees C., toner production was performed for 6 hours continuously, with no clogging of the discharging holes.

A toner and a developer were obtained in the same manner as in Example 1, and subjected to the same measurements and evaluations as in Example 1. The results are presented in Table 2-1 and Table 3-1.

Example 3

[Toner 3] was obtained in the same manner as in Example 1, except that unlike in Example 1, [wax 3] was used as the release agent instead of [wax 1].

[Wax 3] was a synthetic ester wax having a melting point of 75.2 degrees C. and a recrystallization temperature of 64.3 degrees C. (available from NOF Corporation). [Wax 3] and [polyester resin A] were both dissolved transparently in ethyl acetate without being phase-separated.

While the temperatures of the toner composition liquid and of the members of the toner producing apparatus contacted by the toner composition liquid were controlled at 55 degrees C., toner production was performed for 6 hours continuously, with no clogging of the discharging holes.

A toner and a developer were obtained in the same manner as in Example 1, and subjected to the same measurements and evaluations as in Example 1. The results are presented in Table 2-1 and Table 3-1.

Example 4

[Toner 4] was obtained in the same manner as in Example 1, except that unlike in Example 1, [wax 4] was used as the release agent instead of [wax 1].

[Wax 4] was a synthetic ester wax having a melting point of 67.4 degrees C. and a recrystallization temperature of 60.5 degrees C. (available from NOF Corporation). [Wax 4] and [polyester resin A] were both dissolved transparently in ethyl acetate without being phase-separated.

While the temperatures of the toner composition liquid and of the members of the toner producing apparatus contacted by the toner composition liquid were controlled at 55 degrees C., toner production was performed for 6 hours continuously, with no clogging of the discharging holes.

A toner and a developer were obtained in the same manner as in Example 1, and subjected to the same measurements and evaluations as in Example 1. The results are presented in Table 2-1 and Table 3-1.

Example 5

[Toner 5] was obtained in the same manner as in Example 1, except that unlike in Example 1, [wax 5] was used as the release agent instead of [wax 1].

[Wax 5] was a synthetic ester wax having a melting point of 71.7 degrees C. and a recrystallization temperature of 64.5 degrees C. (available from NOF Corporation).

[Wax 5] and [polyester resin A] were both dissolved transparently in ethyl acetate without being phase-separated.

While the temperatures of the toner composition liquid and of the members of the toner producing apparatus contacted by the toner composition liquid were controlled at 55 degrees C., toner production was performed for 6 hours continuously, with no clogging of the discharging holes.

A toner and a developer were obtained in the same manner as in Example 1, and subjected to the same measurements and evaluations as in Example 1. The results are presented in Table 2-1 and Table 3-1.

Example 6

[Toner 6] was obtained in the same manner as in Example 1, except that unlike in Example 1, [wax 6] was used as the release agent instead of [wax 1].

[Wax 6] was a paraffin wax having a melting point of 74.1 degrees C. and a recrystallization temperature of 70.1 degrees C. (available from Nippon Seiro Co., Ltd.).

[Wax 6] and [polyester resin A] were both dissolved transparently in ethyl acetate without being phase-separated.

While the temperatures of the toner composition liquid and of the members of the toner producing apparatus contacted by the toner composition liquid were controlled at 55 degrees C., toner production was performed for 6 hours continuously, with no clogging of the discharging holes.

A toner and a developer were obtained in the same manner as in Example 1, and subjected to the same measurements and evaluations as in Example 1. The results are presented in Table 2-1 and Table 3-1.

Example 7

[Toner 7] was obtained in the same manner as in Example 1, except that unlike in Example 1, [wax 5] was used as the release agent instead of [wax 1] and [polyester resin B] was used instead of [polyester resin A].

[Polyester resin B] was a binder resin formed of terephthalic acid, isophthalic acid, ethylene glycol, and neopentyl glycol and having a weight average molecular weight of 26,000 and Tg of 70 degrees C.

[Wax 5] and [polyester resin B] were both dissolved transparently in ethyl acetate without being phase-separated.

While the temperatures of the toner composition liquid and of the members of the toner producing apparatus contacted by the toner composition liquid were controlled at 55 degrees C., toner production was performed for 6 hours continuously, with no clogging of the discharging holes.

A toner and a developer were obtained in the same manner as in Example 1, and subjected to the same measurements and evaluations as in Example 1. The results are presented in Table 2-2 and Table 3-2.

Example 8

[Toner 8] was obtained in the same manner as in Example 1, except that unlike in Example 1, [wax 5] was used as the release agent instead of [wax 1] and [styrene acrylic resin A] was used instead of [polyester resin A].

[Styrene acrylic resin A] was a copolymerized resin formed of styrene and butyl acrylate and having a glass transition temperature Tg of 62 degrees C.

[Wax 5] and [styrene acrylic resin A] were both dissolved transparently in ethyl acetate without being phase-separated.

While the temperatures of the toner composition liquid and of the members of the toner producing apparatus contacted by the toner composition liquid were controlled at 55 degrees C., toner production was performed for 6 hours continuously, with no clogging of the discharging holes.

A toner and a developer were obtained in the same manner as in Example 1, and subjected to the same measurements and evaluations as in Example 1. The results are presented in Table 2-2 and Table 3-2.

Example 9

[Toner 9] was obtained in the same manner as in Example 1 except that unlike in Example 1, [wax 5] was used as the release agent instead of [wax 1] and the adding amount of the release agent was changed to 2 parts.

A toner and a developer were obtained in the same manner as in Example 1, and subjected to the same measurements and evaluations as in Example 1. The results are presented in Table 2-2 and Table 3-2.

Example 10

[Toner 10] was obtained in the same manner as in Example 1, except that unlike in Example 1, [wax 5] was used as the release agent instead of [wax 1] and the relative humidity during drying was changed to 20% in the toner producing conditions.

A toner and a developer were obtained in the same manner as in Example 1, and subjected to the same measurements and evaluations as in Example 1. The results are presented in Table 2-2 and Table 3-2.

Example 11

[Toner 11] was obtained in the same manner as in Example 1, except that unlike in Example 1, [wax 5] was used as the release agent instead of [wax 1] and the drying temperature during drying was changed to 55 degrees C. and the relative humidity during drying was changed to 20% in the toner producing conditions.

A toner and a developer were obtained in the same manner as in Example 1, and subjected to the same measurements and evaluations as in Example 1. The results are presented in Table 2-2 and Table 3-2.

Example 12

[Toner 12] was obtained in the same manner as in Example 1, except that unlike in Example 1, [wax 5] was used as the release agent instead of [wax 1] and the adding amount of the release agent was changed to 40 parts.

A toner and a developer were obtained in the same manner as in Example 1, and subjected to the same measurements and evaluations as in Example 1. The results are presented in Table 2-3 and Table 3-3.

Example 13

[Toner 13] was obtained in the same manner as in Example 1, except that unlike in Example 1, [wax 5] was used as the release agent instead of [wax 1] and the adding amount of the release agent dispersant was changed to 6 parts.

A toner and a developer were obtained in the same manner as in Example 1, and subjected to the same measurements and evaluations as in Example 1. The results are presented in Table 2-3 and Table 3-3.

Example 14

[Toner 14] was obtained in the same manner as in Example 1, except that unlike in Example 1, [wax 5] was used as the release agent instead of [wax 1] and no release agent dispersant was added.

A toner and a developer were obtained in the same manner as in Example 1, and subjected to the same measurements and evaluations as in Example 1. The results are presented in Table 2-3 and Table 3-3.

Example 15

[Toner 15] was obtained in the same manner as in Example 1, except that unlike in Example 1, [wax 5] was used as the release agent instead of [wax 1], the temperatures of the toner composition liquid and of the members of the toner producing apparatus contacted by the toner composition liquid were controlled at 45 degrees C., and the drying temperature was changed to 55 degrees C. in the toner producing conditions.

A toner and a developer were obtained in the same manner as in Example 1, and subjected to the same measurements and evaluations as in Example 1. The results are presented in Table 2-3 and Table 3-3.

Example 16

[Toner 16] was obtained in the same manner as in Example 1, except that unlike in Example 1, [wax 5] was used as the release agent instead of [wax 1] and the drying time in the additional drying step performed on the toner base particle intermediate product was changed to 120 minutes.

A toner and a developer were obtained in the same manner as in Example 1, and subjected to the same measurements and evaluations as in Example 1. The results are presented in Table 2-3 and Table 3-3.

Example 17

<Production of Toner 24>

A toner 24 was produced in the same manner as in Example 1, except that preparation of the toner composition liquid was changed as described below.

—Preparation of Toner Composition Liquid—

[Wax 1] as a release agent (20 parts by mass), the release agent dispersant described above (2 parts), [polyester resin A] as a binder resin (84.8 parts by mass), and [salicylic acid metal compound 1] (1.4 parts) were mixed in a mixed solvent of ethyl acetate (429 parts by mass) and methyl ethyl ketone (429 parts by mass) and dissolved at 70 degrees C. with a mixer including a stirring blade. After dissolution, the liquid temperature was adjusted to 55 degrees C. To the resultant, the carbon black dispersion liquid described above (50 parts) was further added. Even after addition, no settling or aggregation of the pigment was observed, and the pigment was dispersed uniformly in ethyl acetate.

[Salicylic acid metal compound 1] described above was E-108 (salicylic acid or an aluminum compound as a derivative of salicylic acid: available from Orient Chemical Industries Co., Ltd.).

The average aspect ratio, the release agent content (part by mass) by a DSC method, the Lmax value (micrometer), the ferre diameter (Df) value (micrometer), and the toner displacement amount (nm) by a microcompression test were obtained from [toner 24] in the same manners as in Example 1.

A toner and a developer were obtained in the same manner as in Example 1, and subjected to the same measurements and evaluations as in Example 1. The results are presented in Table 2-3 and Table 3-3.

Example 18

<Production of Toner 25>

[Toner 25] was obtained in the same manner as in Example 17, except that unlike in Example 17, the aromatic carboxylic acid metal compound used was changed to zinc dibenzoate (available from Mitsuwa Chemicals Co., Ltd.).

The average aspect ratio, the release agent content (part by mass) by a DSC method, the Lmax value (micrometer), the ferre diameter (Df) value (micrometer), and the toner displacement amount (nm) by a microcompression test were obtained from [toner 25] in the same manners as in Example 1.

A toner and a developer were obtained in the same manner as in Example 1, and subjected to the same measurements and evaluations as in Example 1. The results are presented in Table 2-3 and Table 3-3.

Comparative Example 1

[Toner 17] was obtained in the same manner as in Example 1, except that unlike in Example 1, [wax 5] was used as the release agent instead of [wax 1] and the additional drying step was not performed on the toner base particle intermediate product.

A toner and a developer were obtained in the same manner as in Example 1, and subjected to the same measurements and evaluations as in Example 1. The results are presented in Table 2-4 and Table 3-4.

Comparative Example 2

[Toner 18] was obtained in the same manner as in Example 1, except that unlike in Example 1, [wax 5] was used as the release agent instead of [wax 1] and the drying time in the additional drying step performed on the toner base particle intermediate product was changed to 20 minutes.

A toner and a developer were obtained in the same manner as in Example 1, and subjected to the same measurements and evaluations as in Example 1. The results are presented in Table 2-4 and Table 3-4.

Comparative Example 3

[Toner 19] was obtained in the same manner as in Example 1, except that unlike in Example 1, [wax 5] was used as the release agent instead of [wax 1], the temperatures of the toner composition liquid and of the members of the toner producing apparatus contacted by the toner composition liquid were controlled at 45 degrees C., and the drying temperature was changed to 40 degrees C. in the toner producing conditions.

A toner and a developer were obtained in the same manner as in Example 1, and subjected to the same measurements and evaluations as in Example 1. The results are presented in Table 2-4 and Table 3-4.

Comparative Example 4

[Toner 20] was obtained in the same manner as in Example 1, except that unlike in Example 1, [wax 5] was used as the release agent instead of [wax 1] and the drying temperature during drying was changed to 55 degrees C. in the toner producing conditions.

A toner and a developer were obtained in the same manner as in Example 1, and subjected to the same measurements and evaluations as in Example 1. The results are presented in Table 2-4 and Table 3-4.

Comparative Example 5

[Toner 21] was obtained in the same manner as in Example 1, except that unlike in Example 1, [wax 5] was used as the release agent instead of [wax 1], and the drying temperature during drying was changed to 55 degrees C. and the relative humidity during drying was changed to 45% in the toner producing conditions.

A toner and a developer were obtained in the same manner as in Example 1, and subjected to the same measurements and evaluations as in Example 1. The results are presented in Table 2-4 and Table 3-4.

Comparative Example 6

[Toner 22] was obtained in the same manner as in Example 1, except that unlike in Example 1, [wax 5] was used as the release agent instead of [wax 1] and the drying temperature in the additional drying step performed on the toner base particle intermediate product was changed to 50 degrees C.

A toner and a developer were obtained in the same manner as in Example 1, and subjected to the same measurements and evaluations as in Example 1. The results are presented in Table 2-4 and Table 3-4.

Comparative Example 7

An attempt was made to produce a toner 23 in the same manner as in Example 1, except that unlike in Example 1, [wax 5] was used as the release agent instead of [wax 5] and the drying temperature in the additional drying step performed on the toner base particle intermediate product was changed to 70 degrees C. However, blocking occurred during the additional drying, to make it impossible to obtain toner particles.

TABLE 2-1

|       |            | Ex. 1 | Ex. 2 | Ex. 3 | Ex. 4 | Ex. 5 | Ex. 6 |
|-------|------------|-------|-------|-------|-------|-------|-------|
| Toner | Kind       | 1     | 2     | 3     | 4     | 5     | 6     |
| Wax   | Kind       | 1     | 2     | 3     | 4     | 5     | 6     |
| Resin | Kind       | Polyester | Polyester | Polyester | Polyester | Polyester | Polyester |
|       |            | A     | A     | A     | A     | A     | A     |
|       | Tg (degree C.) | 65 | 65 | 65 | 65 | 65 | 65 |

TABLE 2-1-continued

|  | Ex. 1 | Ex. 2 | Ex. 3 | Ex. 4 | Ex. 5 | Ex. 6 |
|---|---|---|---|---|---|---|
| Liquid temperature (degree C.) | 55 | 55 | 55 | 55 | 55 | 55 |
| Drying temperature (degree C.) | 60 | 60 | 60 | 60 | 60 | 60 |
| Relative humidity (%) | 8 | 8 | 8 | 8 | 8 | 8 |
| Additional drying temperature (degree C.) | 60 | 60 | 60 | 60 | 60 | 60 |
| Additional drying time (min) | 30 | 30 | 30 | 30 | 30 | 30 |
| Release agent content by DSC method (% by mass) | 6 | 6 | 6 | 6 | 6 | 6 |
| Lmax (micrometer) | 4.9 | 4.3 | 5.1 | 3.8 | 4.9 | 5.2 |
| Df (micrometer) | 5.2 | 5.4 | 5.0 | 5.1 | 5.0 | 5.5 |
| Average aspect ratio | 232 | 96 | 316 | 189 | 262 | 329 |
| Toner displacement amount (nm) | 580 | 459 | 388 | 520 | 426 | 522 |

TABLE 2-2

|  | Ex. 7 | Ex. 8 | Ex. 9 | Ex. 10 | Ex. 11 |
|---|---|---|---|---|---|
| Toner Kind | 7 | 8 | 9 | 10 | 11 |
| Wax Kind | 5 | 5 | 5 | 5 | 5 |
| Resin Kind | Polyester B | Styrene acrylic A | Polyester A | Polyester A | Polyester A |
| Tg (degree C.) | 70 | 62 | 65 | 65 | 65 |
| Liquid temperature (degree C.) | 55 | 55 | 55 | 55 | 55 |
| Drying temperature (degree C.) | 60 | 60 | 60 | 60 | 55 |
| Relative humidity (%) | 8 | 8 | 8 | 20 | 20 |
| Additional drying temperature (degree C.) | 60 | 60 | 60 | 60 | 60 |
| Additional drying time (min) | 30 | 30 | 30 | 30 | 30 |
| Release agent content by DSC method (% by mass) | 6 | 6 | 0.6 | 6 | 6 |
| Lmax (micrometer) | 6.1 | 4.5 | 4.6 | 4.5 | 4.6 |
| Df (micrometer) | 5.3 | 5.1 | 5.1 | 5.0 | 5.2 |

TABLE 2-2-continued

|  | Ex. 7 | Ex. 8 | Ex. 9 | Ex. 10 | Ex. 11 |
|---|---|---|---|---|---|
| Average aspect ratio | 420 | 152 | 186 | 82 | 75 |
| Toner displacement amount (nm) | 564 | 606 | 388 | 612 | 624 |

TABLE 2-3

|  | Ex. 12 | Ex. 13 | Ex. 14 | Ex. 15 | Ex. 16 | Ex. 17 | Ex. 18 |
|---|---|---|---|---|---|---|---|
| Toner Kind | 12 | 13 | 14 | 15 | 16 | 24 | 25 |
| Wax Kind | 5 | 5 | 5 | 5 | 5 | 1 | 1 |
| Resin Kind | Polyester A | Polyester A | Polyester A | Polyester A | Polyester A | Polyester A | Polyester A |
| Tg (degree C.) | 65 | 65 | 65 | 65 | 65 | 65 | 65 |
| Liquid temperature (degree C.) | 55 | 55 | 55 | 45 | 55 | 55 | 55 |
| Drying temperature (degree C.) | 60 | 60 | 60 | 55 | 60 | 60 | 60 |
| Relative humidity (%) | 8 | 8 | 8 | 8 | 8 | 8 | 8 |
| Additional drying temperature (degree C.) | 60 | 60 | 60 | 60 | 60 | 60 | 60 |
| Additional drying time (min) | 30 | 30 | 30 | 30 | 120 | 30 | 30 |
| Release agent content by DSC method (% by mass) | 12 | 6 | 6 | 6 | 6 | 6 | 6 |
| Lmax (micrometer) | 7.1 | 4.2 | 7.6 | 2.2 | 4.2 | 6.2 | 7.3 |
| Df (micrometer) | 5.1 | 5.0 | 5.2 | 5.1 | 5.4 | 5.1 | 5.1 |
| Average aspect ratio | 462 | 68 | 506 | 42 | 160 | 456 | 498 |
| Toner displacement amount (nm) | 612 | 396 | 603 | 385 | 266 | 289 | 355 |

TABLE 2-4

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Toner Kind | 17 | 18 | 19 | 20 | 21 | 22 | 23 |
| Wax Kind | 5 | 5 | 5 | 5 | 5 | 5 | 5 |
| Resin Kind | Polyester A | Polyester A | Polyester A | Polyester A | Polyester A | Polyester A | Polyester A |
| Tg (degree C.) | 65 | 65 | 65 | 65 | 65 | 65 | 65 |
| Liquid temperature (degree C.) | 55 | 55 | 45 | 55 | 55 | 55 | 55 |
| Drying temperature (degree C.) | 60 | 60 | 40 | 55 | 55 | 60 | 60 |
| Relative humidity (%) | 8 | 8 | 8 | 8 | 45 | 8 | 8 |
| Additional drying temperature (degree C.) | Absent | 60 | 60 | 60 | 60 | 50 | 70 |
| Additional drying time (min) | Absent | 20 | 30 | 30 | 30 | 30 | 30 |
| Release agent content by DSC method (% by mass) | 6 | 6 | 6 | 6 | 6 | 6 | Toner particles not obtained due to blocking |
| Lmax (micrometer) | 4.3 | 4.5 | 2.6 | 2.3 | Acicular or | 4.5 |  |

TABLE 2-4-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Df (micrometer) | 5.1 | 5.2 | 5.1 | 4.9 | filiform shape not formed | 5.1 | |
| Average aspect ratio | 302 | 352 | 28 | 23 | | 324 | |
| Toner displacement amount (nm) | crushed | 726 | 523 | 572 | 458 | 768 | |

TABLE 3-1

|  | Ex. 1 | Ex. 2 | Ex. 3 | Ex. 4 | Ex. 5 | Ex. 6 |
|---|---|---|---|---|---|---|
| Cold offset property | A | A | B | A | A | C |
| Image stability | A | A | A | B | A | A |
| Crushability | B | A | A | B | A | B |

TABLE 3-2

|  | Ex. 7 | Ex. 8 | Ex. 9 | Ex. 10 | Ex. 11 |
|---|---|---|---|---|---|
| Cold offset property | A | A | A | C | C |
| Image stability | A | A | A | A | B |
| Crush ability | B | C | A | B | C |

TABLE 3-3

|  | Ex. 12 | Ex. 13 | Ex. 14 | Ex. 15 | Ex. 16 | Ex. 17 | Ex. 18 |
|---|---|---|---|---|---|---|---|
| Cold offset property | A | A | A | A | C | B | B |
| Image stability | B | A | A | A | A | A | A |
| Crushability | C | A | C | A | A | A | A |

TABLE 3-4

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Cold offset property | B | B | D | D | D | B | Not evaluable |
| Image stability | C | C | B | B | B | C | |
| Crushability | D | D | B | C | B | D | |

Aspects of the present invention are as follows, for example.

<1> A toner including at least:

a binder resin; and a release agent, wherein in a transmission electron microscopic (TEM) image of a torn cross-section of the toner, the release agent has an acicular or filiform shape and an average aspect ratio of 31 or greater, and wherein a displacement amount of the toner when 250 micronewtons is applied to the toner in a microcompression test is 700 nm or less.

<2> The toner according to <1>, wherein a maximum length Lmax of the release agent in the toner is greater than or equal to 1.1 times but less than 1.6 times as large as a maximum ferre diameter Df of a toner particle including the release agent, wherein the toner includes a metal compound of an aromatic carboxylic acid, and wherein a metal of the metal compound is any one selected from the group consisting of $Zn^{2+}$, $Al^{3+}$, $Cr^{3+}$, $Fe^{3+}$, and $Zr^{4+}$.

<3> The toner according to <1> or <2>, wherein the aromatic carboxylic acid is salicylic acid or a salicylic acid derivative, and is selected from the group consisting of general formula (1) below, general formula (2) below, and general formula (3) below, General formula (1)

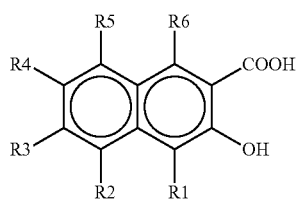

General formula (2)

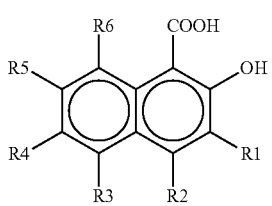

General formula (3)

where in general formula (1), general formula (2), and general formula (3), R1 through R6 represent the same group or different groups, and represent a hydrogen atom, an alkyl group containing from 1 through 12 carbon atoms, an alkenyl group containing from 2 through 12 carbon atoms, —OH, —NH$_2$, —NH(CH$_3$), —N(CH$_3$)$_2$, —OCH$_3$, —O(C$_2$H$_5$), —COOH, or —CONH$_2$.

<4> The toner according to any one of <1> to <3>, wherein a content of the release agent in the toner expressed as a mass equivalent of an endothermic amount of the release agent obtained by a differential scanning calorimetry (DSC) method is from 1% by mass through 10% by mass of the toner.

<5> The toner according to any one of <1> to <4>, wherein the displacement amount of the toner when 250 micronewtons is applied to the toner in the microcompression test is 500 nm or less.

<6> A toner stored unit including
the toner according to any one of <1> to <5>,
wherein the toner is stored in the toner stored unit.

<7> An image forming apparatus including:
an electrostatic latent image bearer;
an electrostatic latent image forming unit configured to form an electrostatic latent image on the electrostatic latent image bearer;
a developing unit including a toner and configured to develop the electrostatic latent image formed on the electrostatic latent image bearer with the toner to form a toner image;
a transfer unit configured to transfer the toner image formed on the electrostatic latent image bearer onto a surface of a recording medium; and
a fixing unit configured to fix the toner image transferred onto the surface of the recording medium,
wherein the toner is the toner according to any one of <1> to <5>.

What is claimed is:
1. A toner comprising:
a binder resin; and
a release agent,
wherein in a transmission electron microscopic (TEM) image of a torn cross-section of the toner, the release agent has an acicular or filiform shape and an average aspect ratio of 31 or greater, and
wherein a displacement amount of the toner when 250 micronewtons is applied to the toner in a microcompression test is 700 nm or less.

2. The toner according to claim 1,
wherein a maximum length Lmax of the release agent in the toner is greater than or equal to 1.1 times but less than 1.6 times as large as a maximum ferre diameter Df of a toner particle that comprises the release agent,
wherein the toner comprises a metal compound of an aromatic carboxylic acid, and
wherein a metal of the metal compound comprises any one selected from the group consisting of $Zn^{2+}$, $Al^{3+}$, $Cr^{3+}$, $Fe^{3+}$, and $Zr^{4+}$.

3. The toner according to claim 1,
wherein the aromatic carboxylic acid comprises salicylic acid or a salicylic acid derivative, and is selected from the group consisting of general formula (1) below, general formula (2) below, and general formula (3) below,

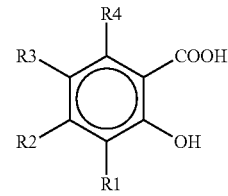

General formula (1)

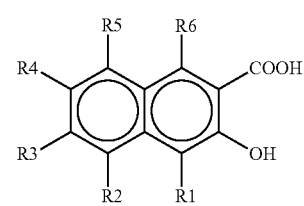

General formula (2)

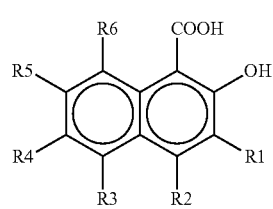

General formula (3)

where in general formula (1), general formula (2), and general formula (3), R1 through R6 represent a same group or different groups, and represent a hydrogen atom, an alkyl group that comprises from 1 through 12 carbon atoms, an alkenyl group that comprises from 2 through 12 carbon atoms, —OH, —NH$_2$, —NH(CH$_3$), —N(CH$_3$)$_2$, —OCH$_3$, —O(C$_2$H$_5$), —COOH, or —CONH$_2$.

4. The toner according to claim 1,
wherein a content of the release agent in the toner expressed as a mass equivalent of an endothermic amount of the release agent obtained by a differential scanning calorimetry (DSC) method is from 1% by mass through 10% by mass of the toner.

5. The toner according to claim 1,
wherein the displacement amount of the toner when 250 micronewtons is applied to the toner in the microcompression test is 500 nm or less.

6. A toner stored unit comprising
the toner according to claim 1,
wherein the toner is stored in the toner stored unit.

7. An image forming apparatus comprising:
an electrostatic latent image bearer;
an electrostatic latent image forming unit configured to form an electrostatic latent image on the electrostatic latent image bearer;
a developing unit that comprises a toner and is configured to develop the electrostatic latent image formed on the electrostatic latent image bearer with the toner to form a toner image;
a transfer unit configured to transfer the toner image formed on the electrostatic latent image bearer onto a surface of a recording medium; and
a fixing unit configured to fix the toner image transferred onto the surface of the recording medium,
wherein the toner comprises the toner according to claim 1.

* * * * *